(12) United States Patent
Sinanoglu et al.

(10) Patent No.: US 10,990,580 B2
(45) Date of Patent: Apr. 27, 2021

(54) SYSTEM, METHOD AND COMPUTER-ACCESSIBLE MEDIUM FOR STRIPPED-FUNCTIONALITY LOGIC LOCKING

(71) Applicants: NEW YORK UNIVERSITY, New York, NY (US); Board of Regents, The University of Texas System, Austin, TX (US)

(72) Inventors: Ozgur Sinanoglu, Saadiyat Island (AE); Jeyavijayan Rajendran, Brooklyn, NY (US); Muhammad Yasin, New York, NY (US)

(73) Assignees: NEW YORK UNIVERSITY, New York, NY (US); BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 179 days.

(21) Appl. No.: 16/170,378

(22) Filed: Oct. 25, 2018

(65) Prior Publication Data
US 2019/0129892 A1 May 2, 2019

Related U.S. Application Data

(60) Provisional application No. 62/576,988, filed on Oct. 25, 2017.

(51) Int. Cl.
*G06F 16/23* (2019.01)
*G06F 16/25* (2019.01)
(Continued)

(52) U.S. Cl.
CPC ........ *G06F 16/2343* (2019.01); *G06F 16/252* (2019.01); *G06F 21/00* (2013.01); *G06F 21/73* (2013.01)

(58) Field of Classification Search
CPC .......................... G06F 16/2343; G06F 16/252
(Continued)

(56) References Cited

U.S. PATENT DOCUMENTS 8,111,089 B2   2/2012   Cocchi et al.
8,510,700 B2   8/2013   Cocchi et al.
(Continued)

OTHER PUBLICATIONS

Alkabani, Yousra M, et al, Active Hardware Metering for Intellectual Property Protection and Security. In USENIX Security. pp. 291-306, 2007.
(Continued)

*Primary Examiner* — Joshua Bullock
(74) *Attorney, Agent, or Firm* — Hunton Andrews Kurth LLP

(57) ABSTRACT

An exemplary system, method and computer-accessible medium for modifying a design of an integrated circuit(s) (ICs), which can include, for example, modifying a logic gate(s) in the design for a protected input pattern(s), and providing a restoration unit(s) into the design, where the restoration unit(s) can be configured to (i) produce an error-free output(s) when a correct secret key can be applied to the restoration unit(s), and (ii) produce an erroneous output(s) when an incorrect key can be applied to the restoration unit(s); and ensure that the modified design along with the restoration unit produces at least one erroneous output with respect to the original design for only a predetermined constant number of incorrect keys based on at least one input pattern.

20 Claims, 17 Drawing Sheets

(51) Int. Cl.
   *G06F 21/73* (2013.01)
   *G06F 21/00* (2013.01)
(58) Field of Classification Search
   USPC .......................................................... 707/704
   See application file for complete search history.

(56) References Cited

U.S. PATENT DOCUMENTS

| | | | |
|---|---|---|---|
| 2004/0102019 A1 | 5/2004 | Jarvis et al. | |
| 2010/0301903 A1 | 12/2010 | Cocchi et al. | |
| 2012/0139582 A1 | 6/2012 | Cocchi et al. | |
| 2017/0089978 A1* | 3/2017 | Hao | G01R 31/3177 |
| 2017/0103236 A1* | 4/2017 | Homayoun, Jr. | G06F 21/87 |
| 2017/0344343 A1* | 11/2017 | Best | G06F 7/582 |
| 2019/0258766 A1* | 8/2019 | Wang | G06F 21/75 |

OTHER PUBLICATIONS

Arm. 2013. Cortex-M0 Processor. [From the Internet] https://www.arm.com/products/ processors/cortex-m/cortex-m0.php, 2013.
Baumgarten, ALEXet al., Preventing IC Piracy Using Reconfigurable Logic Barriers, IEEE Des. Test. Comput. vol. 27, No. 1 pp. 66-75, 2010.
Brayton, Robert et al., ABC: An Academic Industrial-strength Verification Tool. In International Conference on Computer Aided Verication. Springer, pp. 24-40, 2010.
Brglez, Franc et al., Combinational Profiles of Sequential Benchmark Circuits. In IEEE international Symposium on Circuits and Systems. pp. 1929-1934, 1989.
Chen, Quan et al., PrivWatcher: Non-bypassable Monitoring and Protection of Process Credentials from Memory Corruption Attacks. In ACM Asia Conference on Computer and Communications Security. pp. 167-178, 2017.
Chipworks. Intel's 22-nm Tri-gate Transistors Exposed. [From the Internet] http://www.chipworks.com/blog/technologyblog/2012/04/23/intels-22-nm-tri-gate-transistors-exposed/.
Chu, Shuni et al., Multirate filter designs using comb filters. IEEE Transactions on Circuits and Systems, vol. 31, No. 11, pp. 913-924, 1984.
Davidson, S. et al., Notes on ITC'99 Benchmarks. [From the Internet] http://www.cerc.utexas.edu/itc99-benchmarks/bendoc1.html., 1999.
Diguet, Jean-Philippe et al., NOC-centric security of reconfigurable SoC. In IEEE First International Symposium on Networks-on-Chip. pp. 223 232, 2007.
Helfmeier, Clemens et al., Breaking and Entering through the Silicon. In ACM SIGSAC Conference on Computer and Communications Security. pp. 733-744, 2013.
Kamboh, Awais M. et al., Parallel Processing to Enhance Performance of ATPGs, pp. 1-33, Dec. 19, 2005.
Imeson, Frank et al., Securing Computer Hardware Using 3D Integrated Circuit (IC) Technology and Split Manufacturing for Obfuscation. In USENIX Conference on Security. pp. 495-510, 2013.
Maxim Integrated. DeepCover Security Manager for Low-Voltage Operation with 1KB Secure Memory and Programmable Tamper Hierarchy. [From the Internet] https://www.maximintegrated.com/en/products/power/supervisors-voltage-monitors-sequencers/DS3660.html/tb_tab0., 2010.
Kahng, A.B. et al., Robust IP watermarking methodologies for physical design. Design Automation Conference, pp. 782-787, 1988.
Kahng, A.B. et al., Watermarking Techniques for Intellectual Property Protection. In IEEE/ACM Design Automation Conference, pp. 776-781, 1998.
Kammerstetter, Markus et al., Breaking Integrated Circuit Device Security Through Test Mode Silicon Reverse Engineering. In ACM SIGSAC Conference on Computer and Communications Security. pp. 549-557, 2014.
Karri, Ramesh et al, Trustworthy Hardware: Identifying and Classifying Hardware Trojans. Computer , vol. 43, No. 10, 39-46, 2010.
Kirovski, D. et al., Local watermarks: Local watermarks: methodology and application to behavioral synthesis. IEEE Transactions on Computer-Aided Design of Integrated Circuits and Systems 22, vol. 9, pp. 1277-1283, 2003.
Koushanfar, Farinaz et al., Provably Secure Active IC Metering Techniques for Piracy Avoidance and Digital Rights Management. IEEE Trans. Inf. Forensics Security, vol. 7, No. 1, pp. 51-63, 2012.
Koushanfar, Farinaz et al., Hardware Metering. In IEEE/ACM Design Automation Conference. pp. 490-493, 2001.
Kumar, Sailesh et al., Algorithms to accelerate multiple regular expressions matching for deep packet inspection. In ACM SIGCOMM Computer Communication Review, vol. 36. pp. 339-350, 2006.
Massad, M.E. Integrated Circuit (IC) Decamouflaging: Reverse Engineering Camouflaged ICs within Minutes. In Network arid Distributed System Security Symposium, pp. 1-14, 2015.
Massad, M.E. et al., Logic Locking for Secure Outsourced Chip Fabrication: A New Attack and Provably Secure Defense Mechanism. CoRR abs/1703.10187, [From the Internet] http://arxiv.org/abs/1703.10187, 2017.
Oliveira, A.L. Robust Techniques for Watermarking Sequential Circuit Designs. In IEEE/ACM Design Automation Conference. pp. 837-842, 1999.
Perry, T. S. Why Hardware Engineers Have to Think Like Cybercriminals, and Why Engineers Are Easy to Fool. [From the Internet] http://spectrum.ieee.org/view-from-the-valley/computing/embedded-systems/why-hardware-engineers-have-to-think-like-cybercriminals-and-why-engineers-are-easy-to-fool, 2017.
Plaza, S.M. et al., Solving the Third-Shift Problem in IC Piracy With Test-Aware Logic Locking. IEEE Transactions on CAD of Integrated Circuits and Systems, vol. 34, No. 6, pp. 961-971, 2015.
Rajendran, J. et al., Security Analysis of Logic Obfuscation. In IEEE/ACM Design Automation Conference, pp. 83-89, 2012.
Rajendran, J. et al., Fault Analysis-Based Logic Encryption. IEEE Transactions on Computer, vol. 64, No. 2, pp. 410-424, 2015.
Rajendran, J. et al., Security Analysis of Integrated Circuit Camouflaging. In ACM/SIGSAC Conference on Computer & Communications Security. pp. 709-720, 2013.
Rostami, M. et al., A Primer on Hardware Security: Models, Methods, and Metrics. IEEE, vol. 102, No. 8, pp. 1283-1295, 2014.
Roy, J.A, et al., Ending Piracy of Integrated Circuits. IEEE Computer vol. 43, No. 10, pp. 30-38, 2010.
Semi. Innovation is at Risk Losses of up to $4 Billion Annually due to IP Infringement. [From the Internet] www.semi.org/en/Issues/IntellectualProperty/ssLINK/P043785, 2008.
Shamsi, K. AppSAT: Approximately Deobfuscating Integrated Circuits. In to appear in IEEE International Symposium on Hardware Oriented Security and Trust, 2017.
Shen, Y. et al., Double DIP: Re-Evaluating Security of Logic Encryption Algorithms. Cryptology ePrint Archive, Report 2017/290. [From the Internet] http://eprint.iacr.org/2017/290, 2017.
Skudlarek, J. P. et al., A Platform Solution for Secure Supply-Chain and Chip Life-Cycle Management, Computer, vol. 49, No. 8, 28-34, 2016.
Stine, J.E. et al., FreePDK: An Open-Source Variation-Aware Design Kit. In IEEE International Conference on Microelectronic Systems Education, pp. 173-174, 2007.
Subramanyan, P. et al., Evaluating the Security of Logic Encryption Algorithms. In IEEE International Symposium on Hardware Oriented Security and Trust. pp. 137-143, 2015.
Subramanyan, P. et al., Reverse Engineering Digital Circuits Using Functional Analysis. IEEE/ACM Design Automation and Test in Europe, pp. 1-4, 2013.
SypherMedia. SypherMedia Library Circuit Camouflage Technology. [From the Internet] http://www.smi.tv/syphermedia_library_circuit_camouflage_technology,html. 2017.
TechInsights. Samsung Galaxy S8 (SM-G950W) Teardown. [From the Internet] http://www.techinsights.com/about-techinsights/overview/blog/samsung-galaxy-s8-teardown. 2017.
Tehranipoor, M. M. et al., Invasion of the Hardware Snatchers. IEEE Spectrum, vol. 54, No. 5, pp. 36-41, 2017.

(56) References Cited

OTHER PUBLICATIONS

Torrance, R. et al., The State-of-the-Art in Semiconductor Reverse Engineering. In IEEE/ACM Design Automation Conference. pp. 333-338, 2011.
Tuyls, P. et al., Read-ProofHardware from Protective Coatings. In International Conference on Cryptographic Hardware and Embedded Systems, Louis Goubin and Mitsuru Matsui (Eds.). pp. 369-383, 2006.
Vijayakumar, A. et al., Physical Design Obfuscation of Hardware: A Comprehensive Investigation of Device and Logic Level Techniques. IEEE Transactions on Information Forensics and Security, vol. 12, No. 1, pp. 64-77, 2017.
Xie, Y. et al., Mitigating SAT Attack on Logic Locking. In International Conference on Cryptographic Hardware and Embedded Systems. pp. 127-146, 2016.
Xu, X. et al., Novel Bypass Attack and Bead-based Tradeoff Analysis Against all Known Logic Locking Attacks. Cryptology ePrint Archive, Report 2017/621. [From the Internet] http://eprint.iacr.org/2017/ 621, 2017.
Yasin, M. et al., Security Analysis of Logic Encryption against the Most Effective Side-Channel Attack: DPA. In IEEE International Symposium on Defect and Fault Tolerance in VLSI and Nanotechnology Systems. pp. 97-102, 2015.
Yasin, M. et al., SARLock: SAT Attack Resistant Logic Locking. In IEEE International Symposium on Hardware Oriented Security and Trust. pp. 236-241, 2016.
Yasin, M. et al., 2016. CarnoPerturb: Secure IC Camouflaging for Minterm Protection, IEEE/ACM International Conference on Computer-Aided Design, vol. 29, No. 8, pp. 1-29, 2016.
Yasin, M. et al., Security Analysis of Anti-SAT. IEEE Asia and South Pacific Design Automation Conference, pp. 342-347, 2016.
Yasin, M. Removal Attacks on Logic Locking and Camouflaging Techniques. IEEE Transactions on Emerging Topics in Computing, vol. 99, pp. 1-14, 2017.
Yasin, M. et al., On Improving the Security of Logic Locking. IEEE Transactions on CAD of Integrated Circuits and Systems, vol. 35, No. 9, pp. 1411-1424, 2016.
Yasin, M. et al., Activation of Logic Encrypted Chips: Pre-test or Post-Test?. In Design, Automation Test in Europe. pp. 139-144, 2016.
Yasin, M. et al., What to Lock?: Functional and Parametric Locking. In Great Lakes Symposium on VLSI, pp. 351-356, 2017.
Yasin, M. et al., Testing the Trustworthiness of IC Testing: An Oracle-Less Attack on IC Camouflaging. IEEE Transactions on Information Forensics and Security, vol. 12, No. 11, pp. 2668-2682, 2017.
Yasin, M. et al., Ultra-Low Power, Secure IoT Platform for Predicting Cardiovascular Diseases. IEEE Transactions on Circuits and Systems I: Regular Papers PP, vol. 99, pp. 1-14, 2017.
E.J. McCluskey Minimization of Boolean functions. Bell System Technical Journal 35, 6 (1956), 1417-1444.
S. Leef. In Pursuit of Secure Silicon. http://textlab.io/doc/22959027/mr.-serge-leef--vp-new-ventures--mentor-graphics. (2017).

* cited by examiner

Figure 3A
Figure 3B
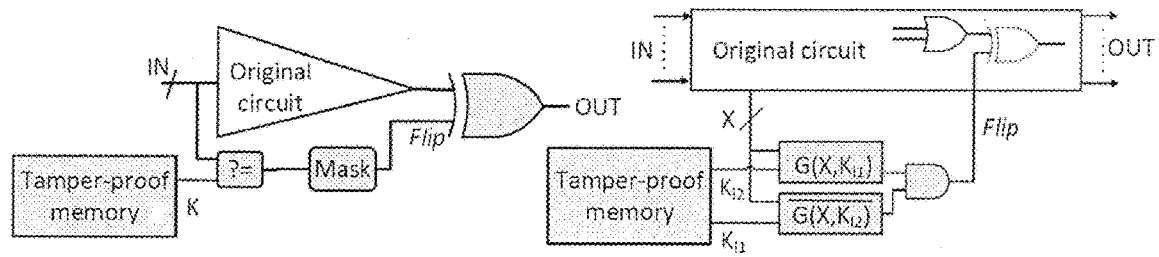
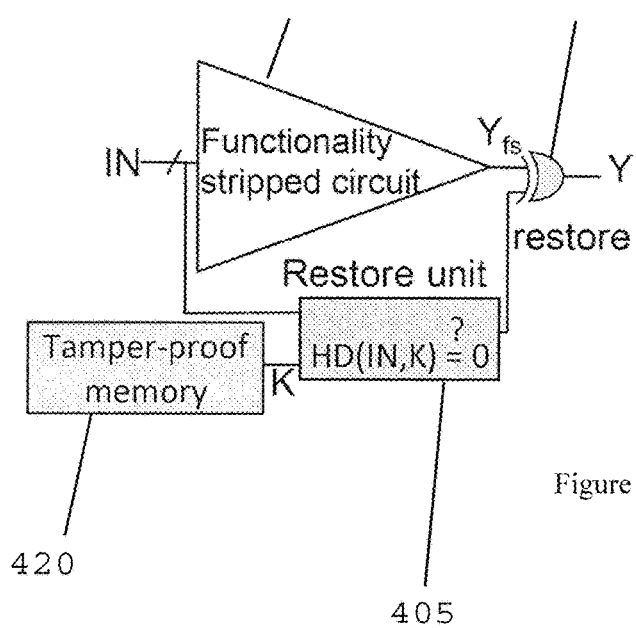
Figure 4

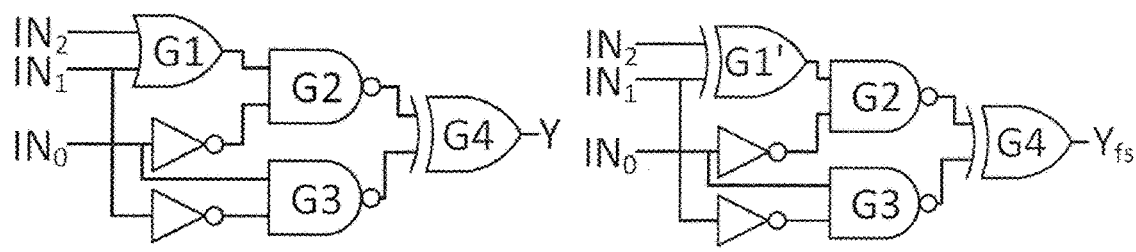
Figure 5A                    Figure 5B
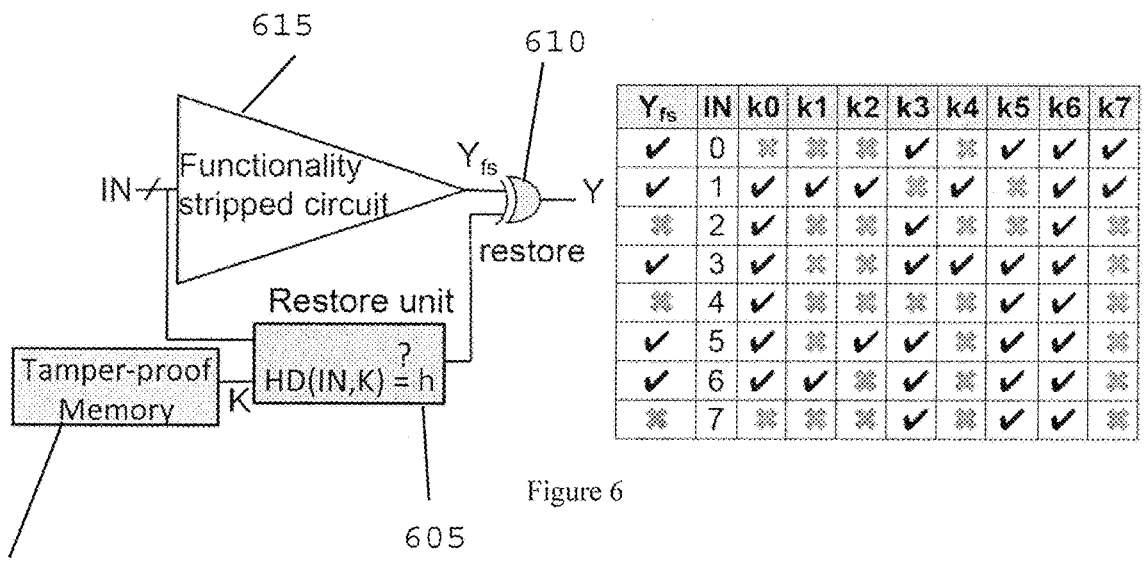
Figure 6

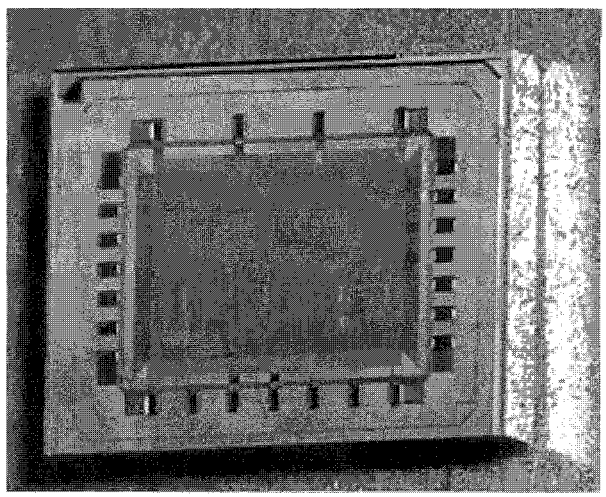
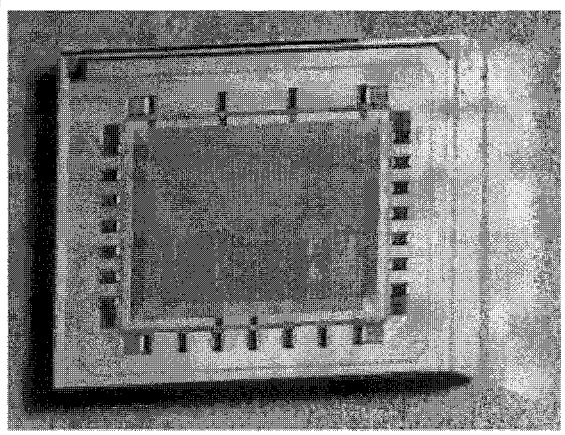
Figure 18A
Figure 18B

Figure 20A
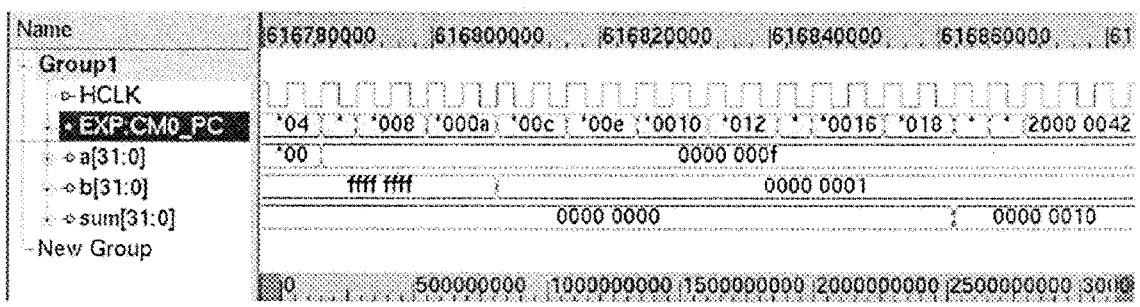
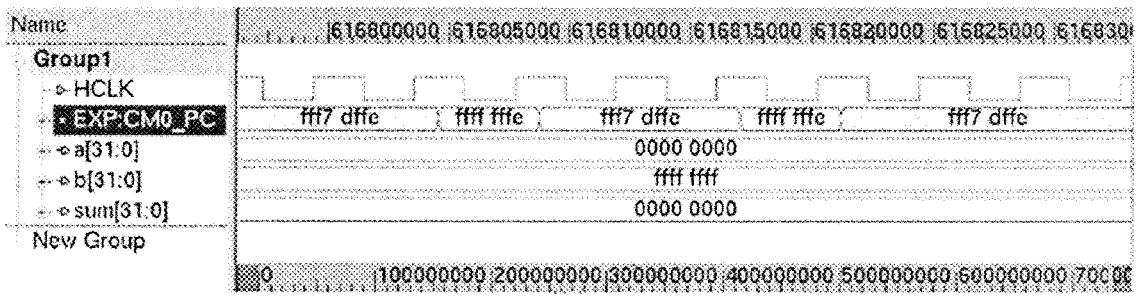
Figure 20B

SYSTEM, METHOD AND COMPUTER-ACCESSIBLE MEDIUM FOR STRIPPED-FUNCTIONALITY LOGIC LOCKING

CROSS-REFERENCE TO RELATED APPLICATION(S)

This application relates to and claims priority from U.S. Patent Application Ser. No. 62/576,988, filed on Oct. 25, 2017, the entire disclosure of which is incorporated herein by reference.

STATEMENT REGARDING FEDERALLY SPONSORED RESEARCH

This invention was made with government support under Grant Nos. 1319841 and 1652842, awarded by the National Science Foundation. The government has certain rights in the invention.

FIELD OF THE DISCLOSURE

The present disclosure relates generally to logic locking, and more specifically, to exemplary embodiments of an exemplary system, method and computer-accessible medium for stripped-functionality logic locking.

BACKGROUND INFORMATION

The increasing cost of integrated circuit ("IC") manufacturing has forced many companies to go fabless over the years. With the outsourcing of IC fabrication in a globalized/distributed design flow including multiple (e.g., potentially untrusted) entities, the semiconductor industry is facing a number of challenging security threats. This fragility in the face of poor state-of-the-art intellectual property ("IP") protection has resulted in hardware security vulnerabilities such as IP piracy, overbuilding, reverse engineering, and hardware Trojans. (See, e.g., References 9, 13, 19, 20, 37, 39, 45 and 47-49).

To address these issues most effectively at the hardware level (see, e.g., Reference 32), a number of hardware design-for-trust ("DfTr") procedures such as IC metering (see, e.g., References 1, 22 and 23), watermarking (see, e.g., References 17, 18, 21 and 31), IC camouflaging (see, e.g., References 3, 4, 27, 28, 35, 46, 51, 56 and 62), split manufacturing (see, e.g., References 14 and 16), and logic locking (see, e.g., References 34, 36, 38, 40, 41, 52, 53, 55, 61 and 63) have been proposed. Logic locking, in particular, has received significant interest from the research community, as it can protect against a potential attacker located anywhere in the IC supply chain, whereas other DfTr procedures, such as camouflaging or split manufacturing, can protect only against a limited set of malicious entities as shown in Table 1 below. Mentor Graphics, a major CAD tool provider, has announced the launch of TrustChain, a framework to support logic locking and camouflaging. (See, e.g., References 26 and 42).

TABLE 1

Protection offered by DfTr techniques against untrusted entities in the IC supply chain.

| Techniques | Foundry | SoC Integrator | Test | User |
|---|---|---|---|---|
| IC metering [1, 22, 23] | X | ✓ | ✓ | ✓ |
| Watermarking [17, 18, 21, 31] | X | X | X | ✓ |
| IC camouflaging [3, 4, 27, 28, 35, 46, 51] | X | ✓ | ✓ | ✓ |
| Split manufacturing [14, 16] | ✓ | X | X | X |
| Logic locking [34, 36, 38, 52, 55] | ✓ | ✓ | ✓ | ✓ |

Logic locking inserts additional logic into a circuit, locking the original design with a secret key. For example, as shown in the diagram of FIG. 1, in addition to the original inputs, a locked circuit 105 has key inputs that are driven by an on-chip tamper-proof memory 110 (see, e.g., References 15 and 50). The additional logic can consist of XOR gates (see, e.g., References 34, 36 and 38) or look-up tables ("LUTs"). (See, e.g., Reference 5).

FIG. 2 shows a diagram providing the IC design flow that incorporates logic locking. For example, as illustrated in FIG. 2, system specifications 205 can be processed through a logic synthesis procedure 210 to produce and original netlist 215. Original netlist 215 can be locked using a logic locking procedure 220 to produce a locked netlist 225. The locked netlist 225 can be processed through a physical synthesis procedure 230 to produce a layout 235. Layout 235 can be fabricated 240, and tested 245, to produce a locked IC 250. Locked IC 250 can be activated 255 to produce a functional IC 260. Thus, the locked netlist passes through the untrusted design phases. Without the secret key (i) the design details cannot be recovered (e.g., for reverse-engineering), and (ii) the IC is not functional; for example, it produces incorrect outputs (e.g., for over-production). A locked IC needs to be activated by loading the secret key onto the chip's memory.

Traditional logic locking procedures choose key gate locations based on various gate selection procedures, such as random logic locking ("RLL") (see, e.g., Reference 38), fault analysis-based logic locking ("FLL") (see, e.g., References 5 and 36), and strong interference-based logic locking ("SLL"). (See, e.g., References 34 and 59). Over the years, many key-recovery attacks have been mounted that exploit the vulnerabilities of logic locking procedures. (See, e.g., References 33, 34, 44, 54 and 60). A summary of these attacks is presented in Table 2 below.

TABLE 2

Attack resiliency of logic locking techniques against the existing attacks.

| Attack | RLL [38] | FLL [5, 36] | SLL [34] | AntiSAT [52] | SARLock [55] | TTLock [61] | Proposed SFLL |
|---|---|---|---|---|---|---|---|
| Sensitization [34] | X | X | ✓ | ✓ | ✓ | ✓ | ✓ |
| SAT [44] | X | X | X | ✓ | ✓ | ✓ | ✓ |
| AppSAT [40] | X | X | X | X | X | X | ✓ |
| Removal/SPS [57] | ✓ | ✓ | ✓ | X | X | ✓ | ✓ |

X denotes susceptibility to the attack and ✓ denotes resilience.

A powerful attack that broke many previous logic locking procedures is a Boolean satisfiability ("SAT")-based key-pruning attack, referred to as SAT attack. The attack is based on the notion of incorrect key elimination using distinguishing input patterns ("DIPs"). (See, e.g., Reference 44). DIPs are computed using a miter circuit constructed using two copies of the locked netlist; the two circuits share the primary inputs but have different key inputs. A DIP is found when the two copies of the locked netlist differ in their outputs. A functional IC with the secret key loaded in its memory is used as an oracle to identify the incorrect keys in an iterative fashion. The computational complexity of the attack is expressed in terms of the number of DIPs generated by the SAT attack. (See, e.g., Reference 44). The latest research on logic locking has focused on defending against the SAT attack. (See, e.g., References 52, 55 and 57).

Two SAT attack resilient logic locking procedures are SARLock (see, e.g., schematic diagram shown in FIG. 3A) and Anti-SAT (see, e.g., schematic diagram shown in FIG. 3B). (See e.g., References 52 and 55). These procedures both use one-point functions to obtain resilience against SAT attacks. SARLock corrupts/inverts the output of the circuit for all the incorrect keys at exactly one input pattern that is different for each incorrect key. The correct key values are hardcoded in logic gates to mask the output inversion for the correct key. (See, e.g., Reference 55). Anti-SAT employs two complementary logic blocks that converge at an AND gate. The output of the AND gate is always 0 only for the correct key; otherwise, it can be 1. Its output corrupts an internal node in the original design for an incorrect key to produce incorrect outputs.

SARLock can be intertwined with one of the gate selection-based logic locking procedures, such as RLL, FLL, or SLL, providing multiple layers of defense. (See, e.g., Reference 55). A variant of the SAT attack, referred to as AppSAT (see, e.g., Reference 40), was recently provided to show that a multi-layered defense comprising a point function and a SAT attack vulnerable logic locking procedure can be reduced to a single-layer defense comprising the point function alone (e.g., from SARLock+FLL to SARLock). The Double-DIP attack achieves the same objective using more powerful 2-DIPs, for example, DIPs that can eliminate at least two incorrect keys in a single iteration. (See, e.g., Reference 41).

Despite their SAT attack resilience, both SARLock (see, e.g., Reference 55) and Anti-SAT (see, e.g., Reference 52) exhibit security vulnerabilities, as they leave the original circuit implementation (e.g., the IP-to-be protected), as is. SARLock is also vulnerable to removal attack. Given a protected/locked netlist, an attacker can identify the comparator/mask blocks and the flip signal that directly feeds the output by tracing the transitive-fanout of key-inputs, and remove these blocks, retrieving the original circuit (e.g., the proprietary IP). Anti-SAT can also be vulnerable to signal probability skew ("SPS") attack. (See, e.g., Reference 57). Given a protected netlist, an attacker can identify the flip signal since it is at the output of the gate whose inputs exhibit the maximum bias towards opposite values. The attacker can then retrieve the original design by re-synthesizing the locked netlist with a constraint value 0 (1) on the flip signal. Even upon additional obfuscation using additional XOR/XNOR and multiplexer key gates (see, e.g., Reference 52), the Anti-SAT block can be isolated using the AppSAT guided removal ("AGR") attack. (See, e.g., Reference 58). In addition, both SARLock and Anti-SAT are also vulnerable to the Bypass attack. (See, e.g., Reference 53). The Bypass attack generally finds a DIP that causes an incorrect output for a wrong key and bypass circuitry is added around the Anti-SAT/SARLock block to fix the output for this DIP. This fix recovers the original design for both SARLock and Anti-SAT since the incorrect key-driven design fails for only one input pattern.

SARLock can be re-architected into TTLock (see, e.g., Reference 61) to gain resilience against removal attacks. TTLock makes changes to the original design to corrupt the output in the absence of the secret key. As SARLock is based on a one-point function, its re-architected version TTLock ends up protecting one input pattern. Thus, the modified netlist and the original netlist differ in their outputs for one input pattern only. Previous work has described this SAT and removal attack resilient architecture but provides neither a CAD framework to effect the design changes, nor a formal analysis proving resilience against various attacks. (See, e.g., Reference 61). Furthermore, protection of a single input pattern can lead to a rigid scheme where the designer lacks the control to hide an arbitrary amount of IP-critical logic in arbitrary parts of his/her design. Protection of a single input pattern, and thus low and uncontrollable corruptibility, can also lead to the recovery of an approximate netlist through attacks, such as AppSAT (see, e.g., Reference 40) and Double-DIP (see, e.g., Reference 41), which SARLock is vulnerable to as well.

Thus, it may be beneficial to provide an exemplary system, method, and computer-accessible medium for stripped-functionality logic locking which can overcome at least some of the deficiencies described herein above.

SUMMARY OF EXEMPLARY EMBODIMENTS

An exemplary system, method and computer-accessible medium for modifying a design of an integrated circuit(s) (ICs), can include, for example, modifying a logic gate(s) in the design for a protected input pattern(s), where the protected input pattern(s) is an input pattern for which the modified design produces a different output than an original design, and providing a restoration unit(s) into the design, where the restoration unit(s) can be configured to (i) produce an error-free output(s) when a correct secret key can be applied to the restoration unit(s), and (ii) produce an erroneous output(s) when an incorrect key can be applied to the restoration unit(s). A behavior of the design(s) can deviate from the original design for only a pre-determined constant number of incorrect keys based on an input pattern(s). A determination can be made as to whether the design and the restoration unit produce an erroneous output(s) with respect an original design for only a pre-determined constant number of incorrect keys based on an input pattern(s).

In some exemplary embodiments of the present disclosure, the restoration unit(s) can include a Hamming Distance checker(s) configured to check a Hamming Distance between the protected input pattern(s) and a key(s). The Hamming Distance checker(s) can be used to protect input patterns that can be of a pre-determined Hamming Distance away from a correct key(s). The correct key(s) can be stored in a tamper-proof memory.

In certain exemplary embodiments of the present disclosure, the restoration unit(s) can include a tamper-proof content-addressable look-up table. The tamper-proof content-addressable look-up table(s) can be used to protect input patterns that can be included in a plurality of input cubes stored in the tamper-proof content-addressable look-up table. The input cubes can be determined based on set of protected inputs patterns using of (i) a cube compression procedure, or (ii) a cube bit selection procedure. Each of the input cubes can have a specified number of bits. Each of the input cubes can be or include a secret key loaded on to the integrated circuit(s). The input cubes can be associated with a flip vector(s). The flip vector(s) can include information regarding which outputs of the integrated circuit(s) can be flipped based on each of the input cubes.

In some exemplary embodiments of the present disclosure, The flip vector(s) can be stored in the tamper-proof content-addressable look-up table. The input cubes can be compressed prior to being stored in the tamper-proof content-addressable look-up table. The input cubes can be compressed, for example, by merging compatible input cubes. The at least one restoration unit(s) can include a plurality of XOR gates and an adder(s). The logic gate(s) can be modified based on a security-aware synthesis procedure which can be configured to reduce a design metric(s) while ensuring that k−log$_2$c is greater than a target security level, and where k is a key size and c is a number of cubes. The design metric(s) can include (i) a power, (ii) an area, or (iii) a delay.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 3A is an exemplary schematic diagram of a SAR-Lock circuit;

FIG. 3B is an exemplary schematic diagram of an anti-SAT circuit;

FIG. 4 is a schematic diagram and an associated table for a SFLL-HD$^0$ architecture according to an exemplary embodiment of the present disclosure;

FIG. 5A is an exemplary circuit diagram of an unmodified circuit according to an exemplary embodiment of the present disclosure;

FIG. 5B is an exemplary modified circuit diagram of the circuit diagram shown in FIG. 5A where gate G1 is replaced with G1' according to an exemplary embodiment of the present disclosure;

FIG. 6 is an exemplary schematic diagram and an associated table for a SFLL-HD$^h$ architecture according to an exemplary embodiment of the present disclosure;

FIG. 18A is an exemplary image of a top-view of a fabricated silicon chip for ARM Cortex-M0;

FIG. 18B is an exemplary image of a top-view of a fabricated silicon chip for ARM Cortex-M0 that has been locked according to an exemplary embodiment of the present disclosure;

FIG. 20A is an exemplary timing diagram of an SFLL-locked ARM Cortex M0 with a correct key according to an exemplary embodiment of the present disclosure;

FIG. 20B is an exemplary timing diagram of an SFLL-locked ARM Cortex M0 with an incorrect key according to an exemplary embodiment of the present disclosure;

Figure 1:
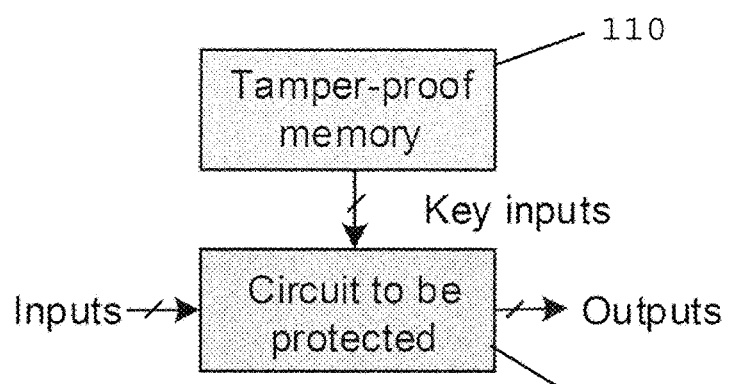
FIG. 1 is an exemplary schematic diagram of a logic-locked design.
Figure 2:
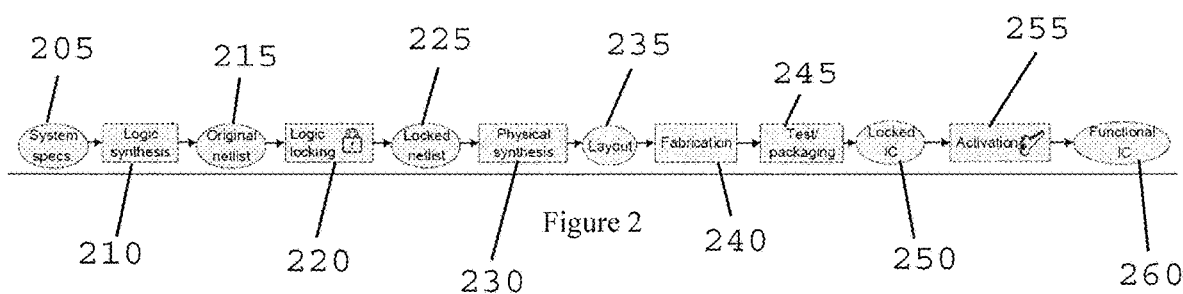
FIG. 2 is an exemplary flow diagram of locking and activation of an integrated circuit.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

While hiding any part of the design IP from its hardware implementation can be sufficient to render general applications resilient to reverse engineers (e.g., removal attacks), there can be applications where a designer can want to specify the specific parts of the IP to hide. Examples include processors with to-be-protected address spaces, for which access can be granted only to restricted entities (see, e.g., Reference 8); network-on-chip ("NoC") routers, where certain IP address ranges can carry particular semantics (see, e.g., Reference 12); intrusion detection systems that rely on pattern matching (see, e.g., Reference 24); and digital signal processing applications, such as comb filters (see, e.g., Reference 10), which accentuate/attenuate frequencies at regular intervals.

Building on previous architecture (see, e.g., Reference 61), the exemplary procedure can strip at least part of the design functionality from its hardware implementation. The exemplary design implemented in hardware can therefore no longer be the same as the original design, as the former can be missing the stripped functionality. An exemplary procedure can be used that can arbitrarily specify this stripped functionality as Stripped-Functionality Logic Locking ("SFLL"). The hardware implementation can have an intentionally controllable built-in error. This error can be canceled by a restore unit only upon the application of the secret key of the logic locking.

The stripped functionality can be captured efficiently in terms of input cubes for which the hardware-implemented design and the original one can produce different outputs. These inputs cubes can be referred to as protected cubes. They can be stored in bits rather than hardcoded in logic gates. SARLock (see, e.g., Reference 55) and Anti-SAT (see, e.g., Reference 52) protect zero cubes, as they implement the design IP as is in hardware. Protected cubes can also be conceived as conditions to manifest the built-in error; a reverse-engineer applying the removal attack can obtain a netlist with this error with respect to the original design.

For exemplary applications that utilize hiding any part of the functionality, it can be sufficient to protect an arbitrary set of cubes. For applications that can be specific about the part of the functionality to hide, the exemplary SFLL framework can facilitate the designer to strip functionality based on IP-critical cubes that he/she can specify and provide as input to the framework.

A set can be defined as S, and its elements can be denoted as $s \in S$. $s \xleftarrow{\$} S$ can be written to denote that s has been sampled uniformly randomly from the set S. $ckt_{lock}$, $ckt_{actv}$, and $ckt_{rec}$ can be used to denote a logic-locked, an activated, and a reconstructed circuit, respectively. For a circuit ckt, the set of all possible inputs and outputs can be denoted as I and O respectively. $\mathcal{A}^\$$ can be used to denote a probabilistic polynomial time ("PPT") adversary $\mathcal{A}$ following an attack strategy $\mathbb{S}$.

A combinational circuit ckt can be a netlist that can implement a Boolean function $F: I \to O$, where $I=\{0,1\}^n$ and $O=\{0,1\}^m$ with n inputs and m outputs. A logic locking procedure $\mathcal{L}$ can be viewed as a triplet of procedures, (Gen, Lock, Activate), where:

(1) Gen can be a randomized key generation procedure, $z \xleftarrow{\$} Gen(1^k)$, where k can denote the key-size,
(2) Lock can be the procedure to lock a circuit's functionality, $ckt_{lock} \leftarrow Lock_z(ckt)$, and
(3) Activate can be a deterministic procedure that can activate the locked circuit, $Ckt_{actv} \leftarrow Activate_z(ckt_{lock})$ such that $\forall i \in I$, $ckt_{actv}(i)=F(i)$.

Exemplary Threat Model

For example, the attacker has access to an oracle, denoted, ckt(•), which can be a copy of a working chip with the secret key loaded onto its memory. The attacker can query the oracle with a set of input patterns and observe the corresponding outputs. Apart from this, the attacker can also have the reverse-engineered netlist $ckt_{lock}$, which can be locked using a logic locking procedure $\mathcal{L}$. It can be assumed that the attacker also knows the corresponding elements between the original and the locked netlist; in other words, he can identify the location of the protection unit. The attack success for an adversary $\mathcal{A}^\$$ can imply recovering a circuit such that:

$$\forall i \in I, ckt_{rec}(i)=F(i), \mathcal{A}^\$ : ckt_{lock} \to ckt_{rec} \quad (1)$$

Exemplary SAT Attack Resilience

SAT attack, a representative and effective oracle-guided attack that iteratively prunes the key space, can query the oracle $ckt_{lock}(\bullet)$ with an input pattern d, called a distinguishing input pattern, to eliminate a set of incorrect keys in each iteration. The attack can terminate after querying the oracle with a set of DIPs, and outputting a single key z'. The attacker $\mathcal{A}^{SAT}$ can reconstruct a circuit $ckt_{rec}$ where $ckt_{rec} \leftarrow Activate_{z'}(ckt_{lock})$ such that Eq. (1) can be satisfied.

A logic locking procedure $\mathcal{L}$ can be called λ-secure against a PPT adversary $\mathcal{A}^{SAT}$, making a polynomial number of queries q(λ) to the oracle, if he/she cannot reconstruct $ckt_{rec}$ with probability greater than $$\frac{q(\lambda)}{2^\lambda}.$$

A logic locking procedure resilient to the SAT attack can also be expected to thwart other variant key-space pruning attacks.

Exemplary Sensitization Attack Resilience

Sensitization attack, which can be another oracle-guided attack, can determine individual key bits by generating and applying patterns that sensitize them to the outputs. Two key bits can be considered pairwise-secure if the sensitization of one key bit cannot be done without controlling the other key bit and vice versa. (See, e.g., Reference 34). SLL can maximize key bits that can all be pairwise-secure. For example, key bits converging at a dominating gate can all be pairwise-secure if there can be no input assignment to block any one of them before they reach the dominating gate. A logic locking procedure $\mathcal{L}$ can be λ-secure against a sensitization attack if λ key bits can all be pairwise secure.

Exemplary Removal Attack Resilience

A removal attack can operate on a locked netlist and can attempt to isolate and remove the protection logic. The attack can be a transformation T: $ckt_{lock} \to ckt_{rec} | \forall i \in I$, $ckt_{rec}=F(i)$, irrespective of the key value. Note that for a removal attack $ckt_{rec}(p) \neq F(p)$, $\forall p \in P$, where P can denote the set of protected patterns. A logic locking procedure $\mathcal{L}$ can be λ-resilient against a removal attack, where λ can denote the cardinality of the set of protected input patterns P.

Exemplary SFLL-HD

SFLL-HD$^h$ can be used for general applications that can benefit from stripping an arbitrary part of the design functionality. It can also be shown that SFLL-HD$^h$ can be a logic locking platform that can provide controllable resilience against all known attacks. In SFLL-HD$^h$, all the protected input cubes can be of the same Hamming Distance h from the secret key; though the set of protected cubes can be restricted, a large number of cubes can be protected through a simple, scalable, and cost-effective hardware.

Exemplary SFLL-HD$^0$

SFLL-HD$^h$ can be used for the special case of h=0; there may only be one protected input cube, and it can be the same as the secret key. Thus, SFLL-HD$^0$ can be functionally the same as TTLock. (See, e.g., Reference 61). SFLL-HD$^0$ can modify a design to invert its output for one selected (e.g., protected) input pattern; this inversion can be the manifestation of the built-in error. The functionality stripping can be effected via logic gate insertions/replacements; the security-aware synthesis module in SFLL-flex can also be used to strip functionality based on a set of protected input cubes. SFLL-HD$^0$ can invert the erroneous output only upon the application of the correct key to the restore unit, thereby, cancelling out the built-in error and recovering the correct output. Moreover, SFLL-HD$^0$ can introduce one additional error into the design along with the inverted output for each incorrect key. Here, the secret key can include the protected input cube selected by the designer.

SFLL-HD$^0$ can have the following exemplary properties:
It can protect exactly one input cube.
Each input pattern can eliminate one and only one incorrect key, thereby ensuring that the SAT attack requires a number of DIPs that can be exponential in terms of the key-size.
Removal attacks, when launched against SFLL-HD$^0$, only recover (e.g., minimally) the modified design that exhibits incorrect (e.g., but approximate) functionality.

Exemplary Construction of SFLL-HD$^0$

As shown in the schematic diagram of FIG. 4, the architecture of SFLL-HD$^h$ can include a restore unit 405, an XOR gate 410, a functionality-stripped circuit 415 and a tamper-proof memory 420. The restore unit 405 can compute or otherwise determine the Hamming distance between the key inputs and the primary inputs. In the special case of SFLL-HD$^0$, the Hamming distance between the primary inputs and the key can be zero, implying that the restore signal can be asserted only when the key inputs and the primary inputs match. Note that for h=0, the restore unit 405 can be reduced to a simple k-bit comparator rendering SFLL-HD$^0$ functionally equivalent to TTLock.

Various exemplary circuits can be used to illustrate the architecture of SFLL-HD$^0$ as shown in the schematic diagram of FIG. 5A. (See, e.g., Reference 61). For example, the circuit can be protected by a three-bit key, n=k=3; the protected cube can be an input pattern, as n=k in this example. The original circuit is shown in the schematic diagram of FIG. 5A whereas the functionality-stripped circuit ("FSC") is shown in FIG. 5B. The original and the functionality-stripped circuits can produce a different output for only input pattern 6. Y$_{fs}$ column in the graph shown in FIG. 4 shows the inversion (e.g., error) for this protected input pattern. This error can be cancelled out by applying the correct key k$_6$ which can assert the restore signal for input pattern 6, thus recovering the desired output as shown in the table in FIG. 4. The table also illustrates that each incorrect key can induce one extra error in the design, leading to two inversions in each column of the table except the one for the correct key.

Exemplary Security Analysis of SELL-HD$^0$ n inputs and k key bits can be assumed, where k≤n. SFLL-HD$^0$ can deliver the same security properties as TTLock. (See, e.g., Reference 61). To establish the security properties of SFLL-HD$^0$, an exemplary procedure was developed. SFLL-HD$^0$ resilience against SAT attack can be achieved by ensuring that the attack encounters its worst-case scenario. In each iteration, a DIP can eliminate exactly one incorrect key, necessitating a number of iterations that can be exponential in the key-size. In the example shown in the schematic diagram of FIG. 4, the attack requires $7=2^3-1$ iterations in the worst-case. However, if the attacker can be fortuitous, he/she can hit the protected input cube and eliminate all incorrect keys at once. In the same example, the protected input pattern IN=6 helps the attacker to eliminate all the incorrect keys immediately. However, as an attacker does not have any information about the protected cube, the probability of such a fortuitous hit can be exponentially small in the number of key bits.

SFLL-Hd$^0$ is K-Secure Against Sat Attack

First, the input cubes can be classified into two sets, the set of protected cubes P and set of unprotected cubes $\hat{P}$. Now, as SFLL-HD$^0$ only contains one protected input cube, P can be a singleton set. Thus, |P|=1 and $|\hat{P}|=2^k-1$. For example, an attacker can recover the secret key and the original functionality of the design if she can find a protected input cube in P. However, for a PPT attacker making only a polynomial number of queries q (k) to the oracle, the probability of finding this cube can be, for example:

$$\frac{|P|}{2^k} + \frac{|P|}{2^k-1} \cdots \frac{|P|}{2^k-q(k)} = \frac{1}{2^k} + \frac{1}{2^k-1} \cdots \frac{1}{2^k-q(k)} \approx \frac{q(k)}{2^k} \quad (2)$$

Note, without loss of generality, the sampling can be considered as without replacement as the SAT attack does not repeat any DIP. Thus, SFLL-HD$^0$ can be k-secure against SAT attack.

Exemplary Sensitization Attack Resilience

SFLL-HD$^0$ is k-Secure Against a Sensitization Attack.

In SFLL-SFLL-HD$^0$, all the k bits of the key can converge within the comparator inside the restore unit to produce the restore signal. Therefore, sensitizing any key bit through the restore signal to the output can utilize controlling all the other key bits. All k bits can therefore be pairwise-secure. SFLL-HD$^0$ can be k-secure against sensitization attack.

Exemplary Removal Attack Resilience

Since the restore signal can be highly skewed towards zero, it can be easily identified by a signal probability skew ("SPS") attack. However, any removal attack would recover only the FSC, without leaking any information about the original design. As the FSC produces an erroneous response for the protected input cube, the design can be resilient against removal attack.

SFLL-HD$^0$ is $2^{n-k}$-Resilient Against Removal Attack.

Suppose the attacker recovers a circuit ckt$_{rec}$ by identifying and removing the restoration logic. Now, ckt$_{rec}$ can produce an incorrect output for the set of protected input cubes, denoted as P. However, it is known that each cube can contain $2^{n-k}$ input patterns. Thus, if Γ can denote the set of all input patterns contained in P, then, for example:

$$cktr_{ec}(i) \neq F(i), \forall\ i \in \Gamma$$

$$|\Gamma| = |P| \times 2^{n-k} \quad (3)$$
$$= 1 \times 2^{n-k}$$
$$= 2^{n-k}$$

Thus, SFLL-HD$^0$ can be $2^{n-k}$-resilient against a removal attack.

Exemplary SFLL-HD$^h$

SFLL-HD$^h$ can be generalized for arbitrary values of h, and can protect all input cubes that can be of Hamming distance of h from the secret key. The number of protected input cubes can be $$\binom{k}{h}.$$

Exemplary Construction of SFLL-HD$^h$.

With a HD of h, an input-size of n, and key-size of k, SFLL-HD$^h$ can invert the FSC output $Y_{fs}$ for $$\binom{k}{h}$$

input cubes, which can contain $$2^{n-k} \cdot \binom{k}{h}$$

patterns. The restore unit, which can include k XOR gates and an adder to compute the Hamming distance, can rectify all these errors for the correct key, while it can introduce a different but possibly overlapping, set of errors for any incorrect key. FIG. 6 shows an exemplary schematic diagram of the architecture of the exemplary SFLL-HD$^h$ (e.g., a Restore unit/device 605, an XOR gate 610, a Functionality-stripped circuit 615 and a tamper-proof memory 620), and an associated table with an example where n=k=3 and h=1. As can be seen from the architecture, the implementation overhead of the restore unit can be independent of h, which can be a hard-coded (e.g., non-secret) constant that can feed the comparator inside the restore unit.

Exemplary Security analysis of SFLL-HD$^h$.

n inputs and k key hits, k≤n can be assumed. Thus, for example, the following can be assumed.

i) SFLL-HD$^h$ is $\left(k - \left\lceil \log_2 \binom{k}{h} \right\rceil\right)$ secure against *SAT* attack.

ii) SFLL-HD$^h$ is k-secure against sensitization attack.

iii) SFLL-HD$^h$ is $2^{n-k} \cdot \binom{k}{h}$-resilient against removal attack.

As shown above, h can be adjusted to trade resilience to one attack for resilience to another. Values of h closer to either 0 or k can deliver higher resilience to SAT and other key-pruning attacks, whereas resilience to the removal attack can be maximized by setting h=k/2.

Exemplary SFLL-FLEX

In contrast to SFLL-HD$^h$, SFLL-flex$^{c \times k}$ can facilitate the user to specify, and thus protect the IP-critical input patterns; the restore unit can store the protected input patterns in a compact form, for example, in the form of c input cubes, each with k specified bits. In this context, the input cubes can be conceived as the secret keys to be loaded onto the chip for the restore unit to recover the stripped functionality. Thus, terms "protected input cubes" and "secret keys" can be used interchangeably for SFLL-flex$^{c \times k}$. The SFLL-flex$^{c \times k}$ framework is shown in the flow diagram shown in FIG. 7.

Figure 7:
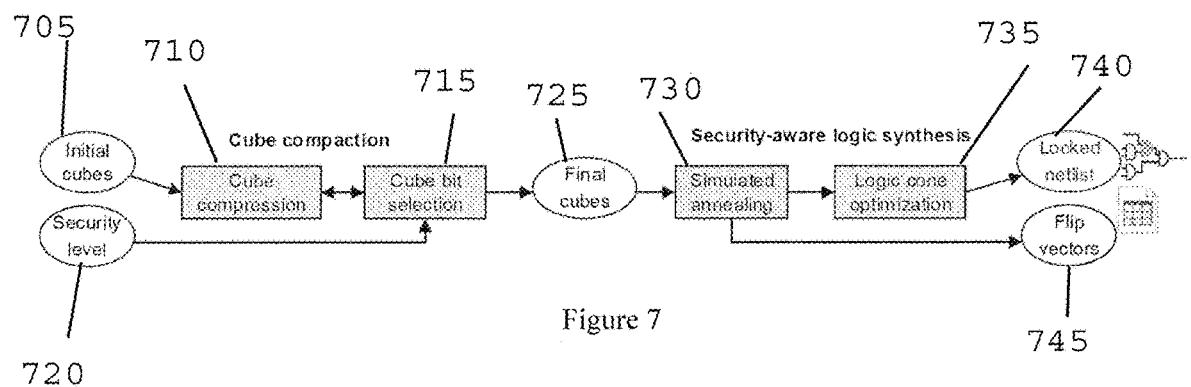
FIG. 7 is an exemplary flow diagram of SFLL-flex$^{c \times k}$ according to an exemplary embodiment of the present disclosure.

For example, as illustrated in the flow diagram of FIG. 7, initial cubes 705 can be compressed at procedure 710. A cube bit selection can be performed at procedure 715, which can be based on the security level 720, to produce final cubes 725. Simulated annealing 730 of the final cubes 725 can be performed, in addition to a logic cone optimization 735, to produce a locked netlist 740. Flip vectors 745 can also be produced as a result of simulated annealing 730.

In a design with multiple outputs, not every output needs protection; only the IP-critical part of the design has to be protected to control the cost of logic locking, which can be at the discretion of the designer. SFLL-flex$^{c \times k}$ can facilitate the outputs to be selectively flipped, and restored, for the protected input cubes; a flip vector associated with each protected input cube can hold information regarding which outputs can be flipped for the protected input cube.

Figure 8:
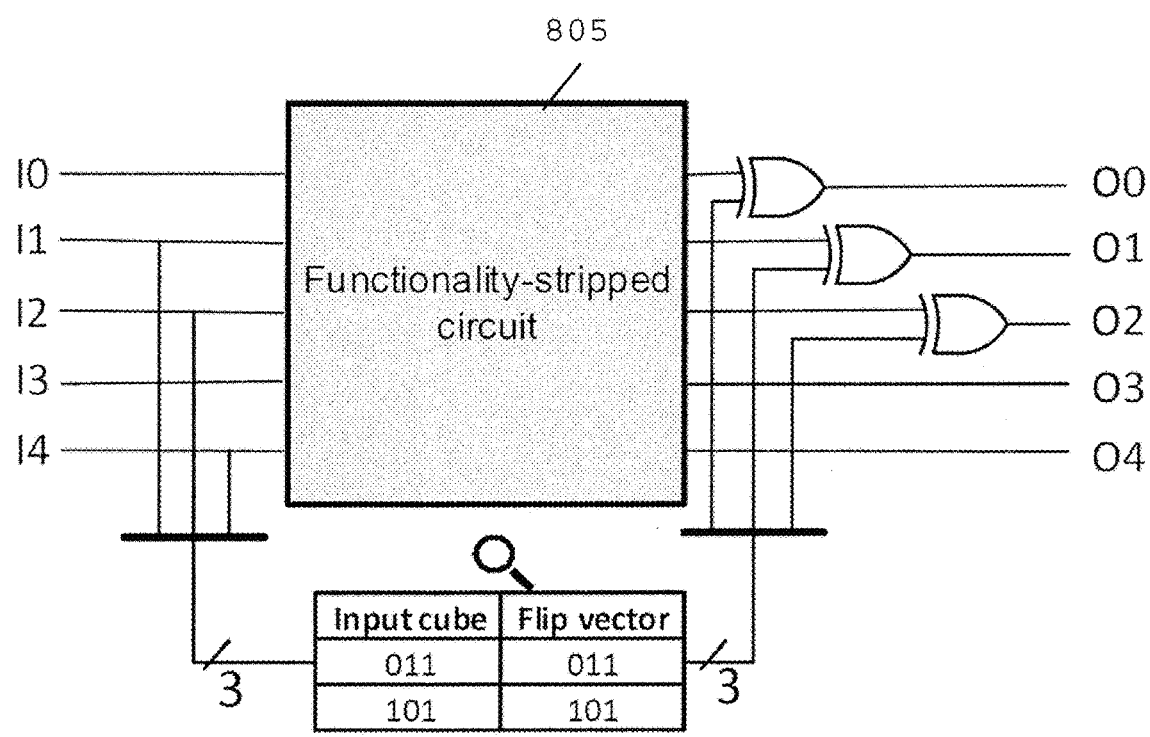
FIG. 8 is an exemplary circuit diagram of SFLL-flex$^{2 \times 3}$ for a circuit with five inputs and five outputs according to an exemplary embodiment of the present disclosure.
Figure 9A:
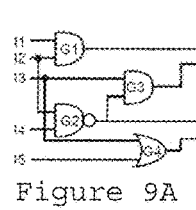
FIG. 9A is an exemplary circuit diagram of an unmodified circuit according to an exemplary embodiment of the present disclosure.
Figure 9B:
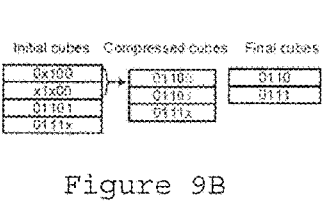
FIG. 9B is an exemplary diagram with an associated table illustrating cube compression of the unmodified circuit from FIG. 9A according to an exemplary embodiment of the present disclosure.
Figure 9C:
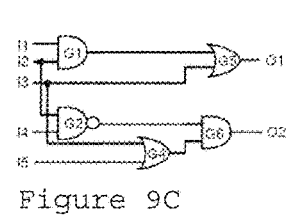
FIG. 9C is an exemplary circuit diagram for FSC according to an exemplary embodiment of the present disclosure.
Figure 9D:
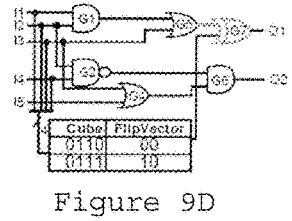
FIG. 9D is an exemplary circuit diagram of a locked circuit according to an exemplary embodiment of the present disclosure.

FIG. 8 shows a schematic diagram of an overview of SFLL-flex$^{c \times k}$ The FSC 805 can differ from the original circuit for two protected input cubes x01x1 and x10x1, collectively representing 8 input patterns. The restore unit can store the two input cubes and the corresponding flip vectors. In this example, only three out of five outputs can be protected.

Exemplary Architecture

The restore unit of SFLL-flex$^{c \times k}$ can include a tamper-proof look-up table ("LUT") and XOR gates (see, e.g., Reference 50). The LUT can store c k-bit input cubes along with the corresponding f-bit flip vectors (e.g., for protecting f out of m outputs) that can dictate the functionality stripped from the circuit. When the input matches an entry in the LUT, the associated flip vector can be retrieved from the table and XORed with the outputs to restore the original functionality.

Exemplary Cost

The cost of SFLL-flex$^{c \times k}$ can be proportional to the size of the LUT, in addition to fXOR gates inserted at the outputs of the FSC. The cost of the LUT can be denoted as c×(k+f), where f can be a designer-defined parameter. Cost minimization can utilize the minimization of c and k. Additionally, functionality stripping can be used to reduce implementation cost. Thus, the net cost of SFLL-flex$^{c \times k}$ can be this savings subtracted from the LUT cost.

Exemplary Optimization framework for SFLL-flex$^{c \times k}$

Given a desired security level s and a set of input cubes, or input patterns, $C_{init}$ to be protected, both provided by the designer for a netlist N, the exemplary stripped-functionality logic locking where implemented at minimal cost: Cost$_{sf}$+ c×k, where Cost$_{sf}$ which can be minimized, can be the implementation cost of the functionality-stripped netlist N$_{sf}$, and c×k can be the implementation cost of the LUT. This can be an optimization problem that can be formulated as, for example:

minimize Cost$_{sf}$+c×k such that $k-\log_2 c \geq s$ where $k-\log_2 c$ can be the security level attained against SAT attacks.

This optimization problem can be broken down into two smaller processes. In the first exemplary process, the input cubes, or input patterns, can be compressed to minimize the LUT cost=c×k, producing the resulting keys in the process, while honoring the security constraint. In the second exemplary process, the logic of the protected outputs can be re-synthesized based on the keys obtained from the first process with the goal of minimizing $Cost_{sf}$. Such a sequential approach where the output of the first process can be fed into the second process can fail to deliver the overall optimum solution.

Exemplary Cube Compression

In this exemplary process, the objective can be to reduce the LUT cost c×k, the major component of overall implementation cost, thus, reducing the exemplary optimization objective to for example:

minimize $c \times k$ such that $k - \log_2 c \geq s$

There can be a couple of exemplary strategies that can be followed to solve this optimization problem. In one exemplary strategy, keys can be created that can flip at least one output for every pattern in every cube in $C_{init}$. The problem then can be finding minimum cubes that collectively cover each cube in $C_{init}$; this can be the classical problem of minimum-cube cover in 2-level logic optimization (see, e.g., Reference 30), and an exemplary synthesis tool can be utilized to solve this problem.

In another exemplary strategy, keys can be created that can flip at least one output for at least one input pattern in every cube in $C_{init}$. In this case, the problem can be to find minimum cubes that, this time, collectively intersect each cube in $C_{init}$. To solve this problem, a heuristic approach, as described in Procedure 1 below, can be utilized. The first step of the exemplary procedure can be cube compression where compatible cubes can be merged to reduce c. To achieve the beneficial security level, $s=k-\log_2 c$, all the k bits in a cube may not need to be considered, reducing k. The second step of the exemplary procedure can be to eliminate, or turn into x's, the bits that can be conflicting among the cubes, while adhering to security level s. This second step can further reduce c, as certain cubes can become compatible for merging.

| | Procedure 1: Cube Compression |
|---|---|
| | Input :Initial cubes $C_{init}$, Security level s |
| | Output:Final cubes C |
| 1 | C ← merge_compatible_cubes($C_{init}$) |
| 2 | $s_{new}$ ← k − $\log_2$ c |
| 3 | while $s_{new}$ ≥ s do |
| 4 | \| C ← eliminate_conflicting_bit(C) |
| 5 | \| C ← merge_compatible_cubes(C) |
| 6 | \| $s_{new}$ ← update_security_level(c, k) |
| 7 | end |

Consider c17 ISCAS benchmark circuit shown in the schematic diagram of FIGS. 9A-9D, which includes a set of four 5-bit initial cubes, and security level s=3, as specified by the designer. The two initial cubes 0x100 and x1x00 can be merged into one cube 01100, reducing c to three. Next, k can be reduced to four by eliminating the rightmost bit in all the cubes. Elimination of bits in conflict can also lead to further reduction in c to two, as more cubes can now be merged; the achieved security level becomes s=3. Thus, compared to initial 4×5=20 bits, only 2×4=8 bits need to be stored on-chip.

Exemplary Security-Aware Synthesis

If the designer explicitly specifies which output can be flipped for each cube, then the flip vectors can already be determined. Such a rigid scheme does not offer any opportunity for optimization; the selected output functions can be flipped for the corresponding input patterns included in the protected input cubes. An exemplary logic synthesis tool can be used for this purpose. On the other hand, if the designer chooses not to specify the flip vectors, a security-aware synthesis process can leverage this flexibility to minimize implementation cost of the functionality-stripped design $N_{sf}$ without compromising security. The exemplary process can also produce the flip vectors, denoted by V, as described in Procedure 2 below.

| | Procedure 2: Security-Aware Synthesis |
|---|---|
| | Input :Original netlist N, Final cubes C |
| | Output:Functionality-stripped netlist $N_{sf}$, Flip vector V |
| 1 | V ← init_flip_vector(N) |
| 2 | $N_{sf}$ ← rand_soln(N, C) |
| 3 | $cost_{sf}$ ← cost($N_{sf}$) |
| 4 | T = 1.0, $T_{min}$ = 0.00001, α = 0.9 |
| 5 | while T > $T_{min}$ do |
| 6 | \| for i = 1 to 200 do |
| 7 | \| \| $N_{new}$ ← neighbor($N_{sf}$, C) |
| 8 | \| \| $cost_{new}$ ← cost($N_{new}$) |
| 9 | \| \| if Rand(0, 1) < $\exp\left(\frac{cost_{new} - cost_{sf}}{T}\right)$ then |
| 10 | \| \| \| $N_{sf}$ ← $N_{new}$ |
| 11 | \| \| \| $cost_{sf}$ ← $cost_{new}$ |
| 12 | \| \| \| V ← update_flip_vector($N_{sf}$, po) |
| 13 | \| \| end |
| 14 | \| end |
| 15 | \| T = T × α |
| 16 | end |

Procedure 2 starts with the original netlist N and a set of cubes C. Initially, a random solution $N_{sf}$ with the associated cost $cost_{sf}$ can be generated by initializing the flip vector V with a random value. From this random solution, simulated annealing can start optimization by selecting a neighboring solution at each iteration. A new solution $N_{new}$ can be generated by changing a random bit in the flip vector V, which can lead to the inclusion/exclusion of the corresponding cube for a particular output. The solution $N_{new}$ can be accepted if it yields cost savings, for example, $cost_{new} < cost_{sf}$. An inferior solution can be accepted with a probability $$\exp\left(\frac{cost_{opt} - cost_{new}}{T}\right).$$

This can be a key feature of simulated annealing for exploring a larger search space without getting stuck at a local optimum.

The application of security-aware synthesis to the c17 circuit shown in FIGS. 9A-9D can be considered. Procedure 2 can operate on the original c17 netlist and the final cubes produced by Procedure 1, and can produce the FSC; AND gate G3 can be removed from the logic cone O1. The flip vector 10 can restore the stripped functionality for logic cone O1 by flipping its output for the cube 0110x.

Exemplary Security Analysis for SFLL-Flex$^{c \times k}$

An attacker, following a SAT-based or a random guess attack model, must typically identify all input patterns of the protected input cubes in SFLL-flex$^{c \times k}$ to be able to recover the correct functionality of the original design from the on-chip implementation; in contrast to SFLL-HD$^h$, the protected input cubes can be arbitrary in SFLL-flex$^{c \times k}$, and one cube may not infer another. This can utilize the retrieval of the content of the entire LUT that can represent the stripped functionality. Nevertheless, the security strength of SFLL can be assessed conservatively; attack success can be defined by the attacker's ability to retrieve any input pattern that belongs to one of the protected input cubes. The following exemplary procedure establishes the resilience of SFLL-flex$^{c \times k}$ against SAT attack.

SFLL-flex$^{c \times k}$ is (k−⌊log$_2$c⌋)-secure against SAT attack.
Sensitization Attack Resilience.
SFLL-flex$^{c \times k}$ is k-secure against sensitization attack.
Removal Attack Resilience.
SFLL-flex$^{c \times k}$ is c·$2^{n-k}$-resilient against removal attack.

The number and the size of the protected input cubes, denoted by c and k respectively, can describe the trade-off between resilience to oracle-guided and removal attacks.

Exemplary Simulation Results
Exemplary Experimental Setup

The exemplary experiments were executed on a 28-core Intel Xeon processors running at 2 GHz with 128 GB of RAM. The combinational part of the sequential benchmark circuits from the ISCAS'89 (see, e.g., Reference 7) and ITC'99 (see, e.g., Reference 11) suites in the exemplary experiments were locked. Table 3 below shows the statistics for the circuits; the largest circuit b18 has greater than about 100K gates. The area, power, and delay ("APD") overhead for SFLL-HD and SFLL-flex versions were obtained using Synopsys Design Compiler along with Global Foundries 65 nm LPe library. The exemplary results of security analysis are shown where different variants of the SAT attack were launched on various versions of SFLL-HD and SFLL-flex. In particular, the SAT attack (see, e.g., Reference 44) and the AppSAT (see, e.g., Reference 40) were launched against the exemplary procedures. Each attack experiment was repeated ten times to improve the statistical significance; average results of the ten runs were reported.

TABLE 3

Statistics for the largest ITC'99 (see, e.g., Reference 11) and ISCAS'89 (see, e.g., Reference 7) benchmarks.

| | Benchmark | Functionality | Inputs | Outputs | Gate count | LLC inputs |
|---|---|---|---|---|---|---|
| Small | s35932 | N/A | 1763 | 2048 | 12,204 | 195 |
| | s38417 | N/A | 1664 | 1742 | 8709 | 99 |
| | s38584 | N/A | 1464 | 1731 | 11448 | 147 |
| | b14 | Viper processor | 277 | 299 | 9,767 | 218 |
| | b15 | 80386 processor | 485 | 519 | 8,367 | 306 |
| Large | b17 | 3 × b15 | 1452 | 1512 | 30,777 | 308 |
| | b18 | 2 × b14 + 2 × b17 | 3357 | 3343 | 111,241 | 271 |
| | b20 | 2 × modified b14 | 522 | 512 | 19,682 | 282 |
| | b21 | 2 × b14 | 522 | 512 | 20,027 | 282 |
| | b22 | 3 × modified b14 | 767 | 757 | 29,162 | 283 |

LLC denotes the largest logic cone.

Exemplary SFLL-HD$^h$
Exemplary Security Analysis.

The resilience of SFLL-HD$^h$ can be described by the key-size k and h, which together can describe the number of protected input cubes $$\binom{k}{h}.$$

Figure 10:
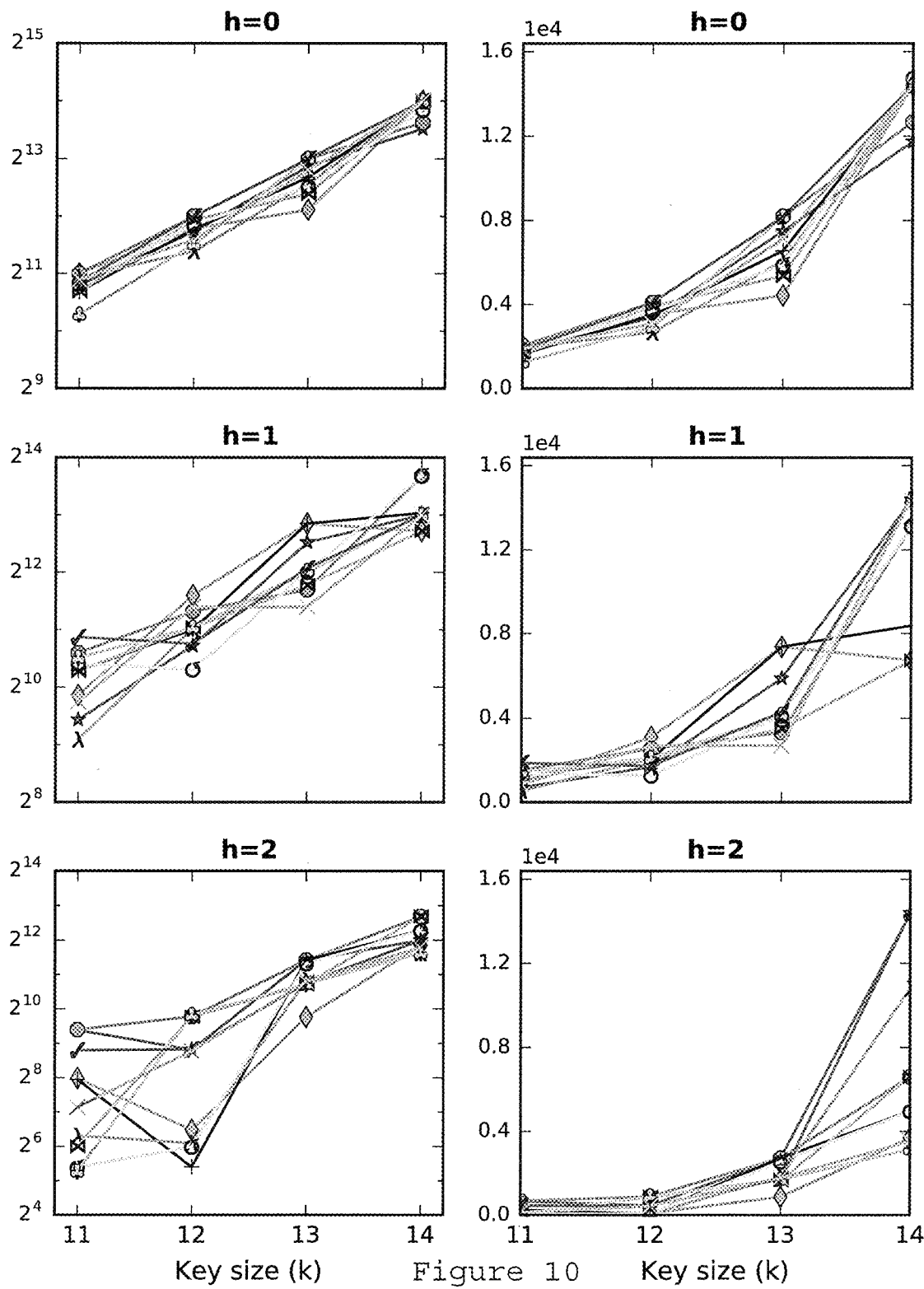
FIG. 10 is a set of graphs of exemplary simulation results for SFLL-HD$^h$ according to an exemplary embodiment of the present disclosure.

In SFLL-HD experiments, the largest logic cone in each circuit can be protected. The number of DIPs utilized for the SAT attack to succeed on SFLL-HD$^h$ circuits, and the corresponding execution time are shown in FIG. 10 for k={11,12,13,14} and h={0,1,2}. Although the actual security levels utilized in a practical setting can be much larger (e.g., 64-bit or 128-bit), the security of SFLL may not be empirically assessed for such high values due to computational limitations. In order to analyze various trends, small key-sizes can be utilized.

FIG. 10 shows that the number of DIPs utilized for the SAT attack to succeed can grow exponentially in k, confirming the exemplary theoretical expectation. For instance, the expected number of DIPs utilized to break SFLL-HD$^0$ can be $2^{k-1}$. The same trend holds for SFLL-HD$^1$ and SFLL-HD$^2$ as well, except for a few cases where an attacker can be fortuitous and the attack terminates earlier, reducing the average number of DIPs.

The execution time of the SAT attack can be proportional to the number of DIPs, although there can be a slight variation of 3× to 4× across the benchmark circuits; the execution time can grow exponentially in k.

Exemplary Impact of Hamming Distance h.
SFLL-HD$^h$ can be $$\left(k - \left\lceil \log_2 \binom{k}{h} \right\rceil \right)$$

secure. Thus, an increase in h can lead to a significant change in the security level and the expected number of DIPs utilized for the SAT attack. For example, the average number of DIPs for the circuit s38584 for h={0,1,2} and k=14 can be 15K, 10K, and 5K, respectively, as shown in FIG. 10.

Exemplary APD Overhead.

Figure 11:
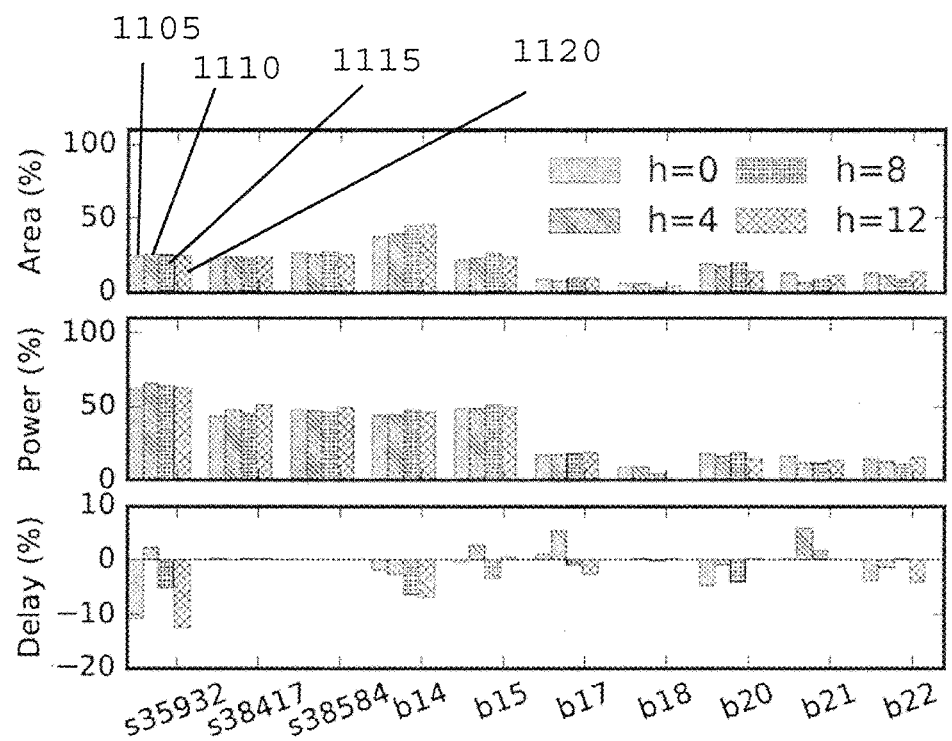
FIG. 11 is a set of exemplary graphs illustrating the area, power, and delay overhead for SFLL-HD$^h$ according to an exemplary embodiment of the present disclosure.

The APD overhead can be obtained using Synopsys DC Compiler using Global Foundries 65 nm LPe library (see, e.g., Reference 43) and is shown in the graphs of FIG. 11 for k=128. For example, FIG. 11 shows a Hamming Distance h of 0 (element 1105), 4 (element 1110), 8 (element 1115) and 12 (element 1120). The overhead for SFLL-HD can be attributed to two sources: (i) the restore unit and (ii) the functionality-stripped circuit. SFLL-HD$^h$ restore unit can include a single k-bit comparator along with an adder unit, where the overhead can be anticipated to increase linearly in k but to remain constant for h, which can be a hard-coded constant (e.g., as it need not be a secret). The 128-bit comparator and adder blocks can incur a significant area, power, and delay overhead on small-sized circuits; for the smallest five benchmarks (e.g., approximately 10K gates), area, power, and delay overhead can be 28%, 50%,−2%, respectively. For larger-sized circuits, however, the overhead of the restore unit can be amortized; for the largest five benchmarks, the average area, power and delay overhead may only be 10%, 6%, and −5%, respectively, boding well for even larger-sized industrial circuits.

Exemplary Scalability.

Figure 12:
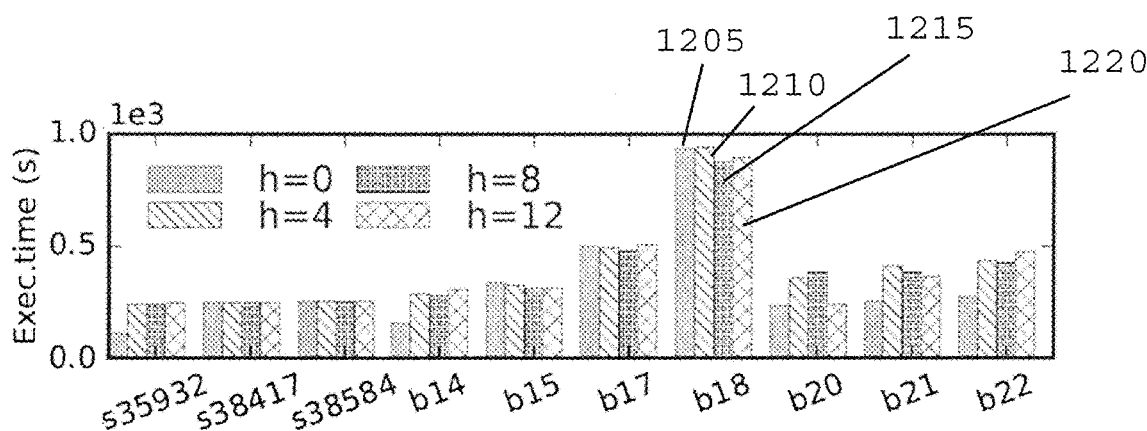
FIG. 12 is an exemplary graph illustrating the execution time of SFLL-HD$^h$ according to an exemplary embodiment of the present disclosure.

The SFLL-HD$^h$ procedure can operate on the RT-level circuit. FIG. 12 shows a graph illustrating that the execution time of the SFLL-HD procedure may only be a few minutes, irrespective of h. For example, FIG. 12 illustrates a Hamming Distance h of 0 (element 1205), 4 (element 1210), 8 (element 1215) and 12 (element 1220) For b18 circuit with more than 100K gates, the execution time may only be about 15 minutes, confirming the scalability of the exemplary SFLL-HD$^h$.

Exemplary SFLL-Flex$^{c \times h}$

Exemplary Security Analysis.

Figure 13:
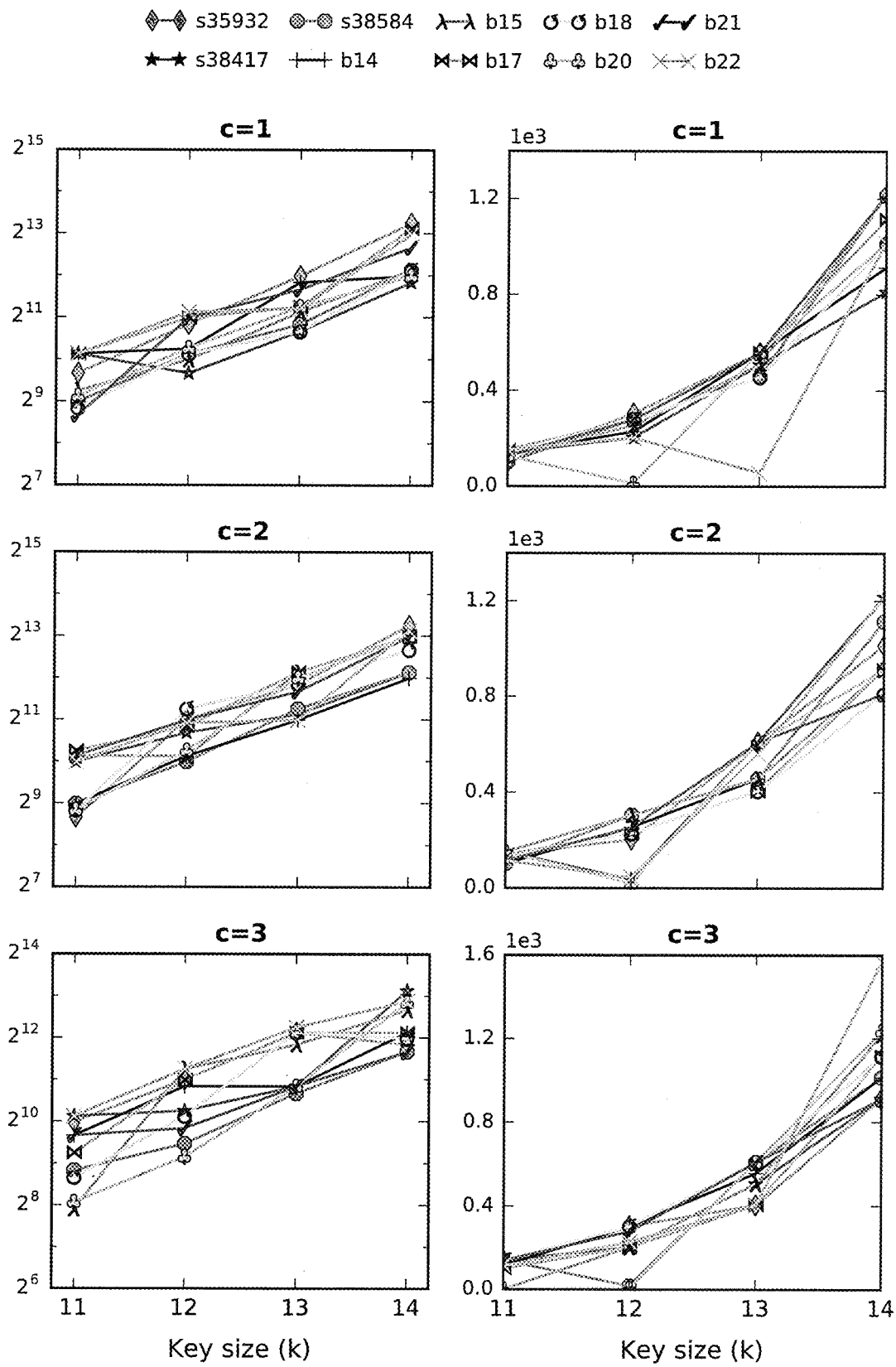
FIG. 13 is a set of exemplary graphs illustrating the simulation results of SFLL-flex$^{c \times k}$ according to an exemplary embodiment of the present disclosure.

To validate the security of the exemplary SFLL-flex, the SAT attack (see, e.g., Reference 44) and AppSAT (see, e.g., Reference 40) attack were launched on circuits locked using SFLL-flex for c={1,2,3} and k={11,12,13,14}. The results shown in the graphs of FIG. 13 demonstrate that the number of DIPs for SFLL-flex can be exponential in k. With increasing c, a logarithmic decrease in the number of DIPs can be observed. The trends for the execution time can be similar to that for DIPs, except that the increase in execution time can be more prominent. While the DIPs double for each increment in k, the execution time increased by 3-5×. The AppSAT (see, e.g., Reference 40) attack on SFLL-flex again fails in 100% of the cases.

Exemplary Cube Compression.

The savings for the cube compression procedure are shown in Table 4 below. In the exemplary experiments, test cubes were generated for randomly selected $c_{init}$ stuck-at faults by using an Atalanta test pattern generation tool (see, e.g., Reference 25), and these test cubes were treated as the designer-provided input cubes $C_{init}$. The compression ratio R were computed as the ratio of the initial number of key bits to be stored $c_{init} \times k_{init}$ to that of compressed key bits $c_{final} \times k_{final}$; $k_{init}$ equals the number of inputs n. The results are presented for two different security levels s=64 and 128 and for two different numbers of initial cubes c=32 and 64. On average, a compression level of 400× can be achieved while still maintaining the desired security level. These compression levels directly translate to a reduction in implementation cost for the restore unit. It can be noted that a lower security level (s=64) facilitates a higher compression level.

TABLE 4

Cube compression ratio R for SFLL - flex$^{c \times k}$.

| Bench | s = 64 | | s = 128 | |
| --- | --- | --- | --- | --- |
| | c = 32 | c = 64 | c = 32 | c = 64 |
| s35932 | 867.9 | 1735.9 | 437.3 | 874.7 |
| s38417 | 403.4 | 806.8 | 136.5 | 409.6 |
| s38584 | 354.9 | 1441.5 | 180.2 | 360.4 |
| b14 | 26.5 | 52.9 | 6.7 | 14.9 |
| b15 | 238.8 | 115.8 | 120.3 | 79.6 |
| b17 | 352.0 | 469.3 | 59.1 | 70.4 |
| b18 | 813.8 | 3305.4 | 832.7 | 234.3 |
| b20 | 126.5 | 61.4 | 31.9 | 42.5 |
| b21 | 49.9 | 99.7 | 31.9 | 36.4 |
| b22 | 91.6 | 183.2 | 62.9 | 74.9 |
| Average | 332.5 | 827.2 | 190.0 | 219.8 |

Exemplary Security-Aware Synthesis.

Figure 14:
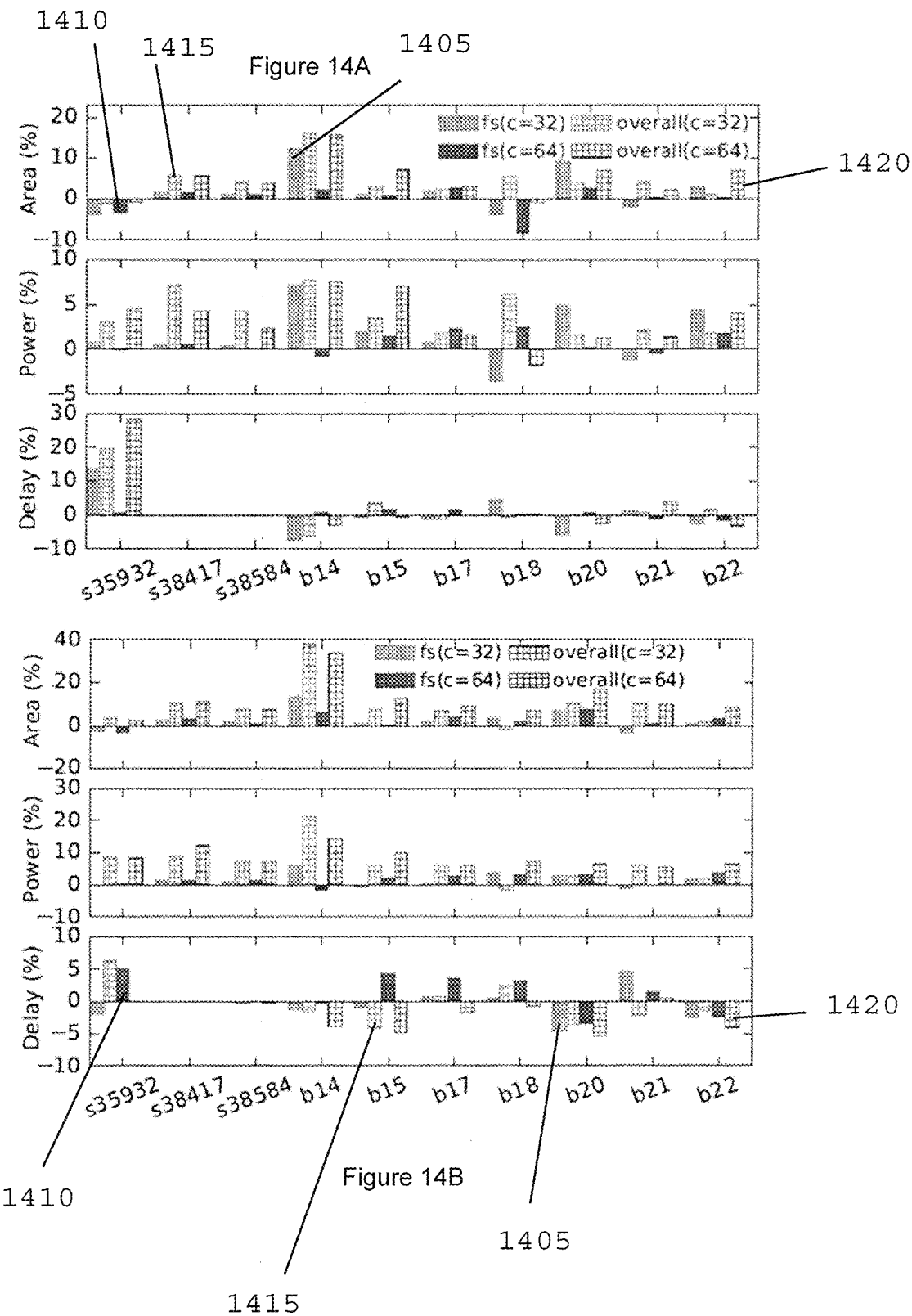
FIGS. 14A and 14B are graphs illustrating the area, power, and delay overhead for SFLL-flex$^{c \times k}$ according to an exemplary embodiment of the present disclosure.

The API) overhead can be reported separately for (i) for the "optimal-cost" FSC (e.g., without the restore unit) and (ii) the overall circuit (e.g., with the restore unit comprising the LUT and the surrounding combinational logic). The APD overhead is shown in graphs of FIGS. 14A and 14B for target security levels s=64 bits and 128, respectively. For example, FIGS. 14A and 14B shown fcs=32 (element 1405), fsc=64 (element 1410), overall c=32 (element 1415) and overall c=64 (element 1420). The simulated-annealing based optimization was accomplished using area as the primary cost metric. The ABC (see, e.g., Reference 6) synthesis tool was used to convert a design to And-Invert-Graph and the gate count can be taken as the cost metric. It can be inferred that security-aware synthesis can incur only a minimal overall overhead of 5%, 4% and 2% for area, power, and delay for a security level s=64, and 11%, 8% and −1% for a security level s=128. Negative values can denote a reduction in APD when compared to the original circuit due to the functionality-strip operation; for example, this can be seen for the circuit s35932 in its area footprint. However, due to the overhead of the restore unit including mostly sequential elements, the overall overhead was positive. In the majority of the cases, the delay overhead can be almost negligible (e.g., about 0%). This can be due to the fact that adding the restore unit may not actually affect the delay of the critical path, thus, incurring no significant performance penalty.

Figure 15:
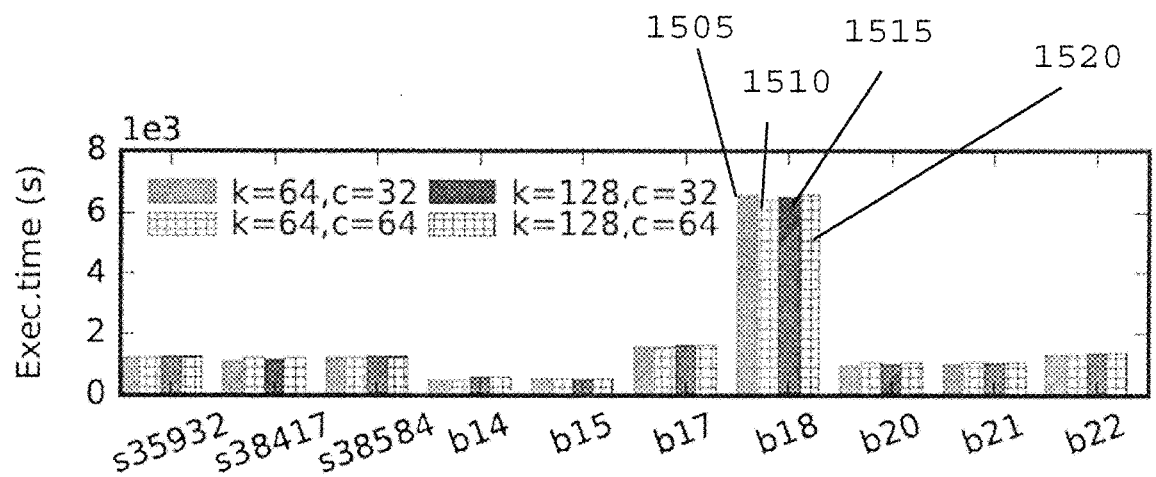
FIG. 15 is an exemplary chart illustrating the combined execution time of cube compression and security-aware synthesis for SFLL-flex$^{c \times k}$ according to an exemplary embodiment of the present disclosure.

The combined execution time for cube compression and security-aware synthesis is shown in a graph of FIG. 15 for (i) K=64, c=32 (element 1505), (ii) K=64, c=64 (element 1510), (iii) K=128, c=32 (element 1515), and (iv) K=128, c=64 (element 1520). The execution time for cube compression can be in the order of a few seconds. The execution time for security-aware synthesis can be directly determined by the simulated annealing parameters (e.g., the temperature T and the gradient ∝) and the size (e.g., number of gates) of a circuit. As shown in FIG. 15, even for large circuits such as b18 with greater than about 100K gates, the synthesis can be completed in about two hours. The exemplary empirical results indicate that the execution time remains independent of the security level s and the number of protected cubes k, confirming the scalability of the exemplary SFLL-flex$^{c \times k}$.

Double-DIP/AppSAT Attack Results

While the SAT attack terminates only upon retrieving the correct key, the AppSAT (see, e.g., Reference 40) and Double-DIP (see, e.g., Reference 41) attacks can (e.g., counter-intuitively) terminate earlier, returning an incorrect key value, which can result in an approximate netlist. (See, e.g., Reference 40). The termination criteria for AppSAT can be described by an error rate specified by the attacker, whereas, Double-DIP can terminate when it can no longer find DIPs that eliminate at least two incorrect keys.

Exemplary Double-DIP.

Each of the 2-DIPs employed by the Double-DIP attack can eliminate at least two incorrect keys. Since no such 2-DIPs exist for SFLL-HD$^0$ and SFLL-flex$^{1 \times k}$, the attack can terminate immediately, recovering an approximate netlist. For larger h and c values, each input pattern can be a 2-DIP, leading to scalability issues for the Double-DIP attack. As shown in a graph of FIG. 16, the attack then behaves similarly to the SAT attack, except that the execution time of the two attacks can vary depending on the DIPs employed by the two attacks.

Exemplary AppSAT.

In the first set of exemplary AppSAT experiments, various AppSAT parameters were used (see, e.g., Reference 40), for example, 50 random queries to the oracle were employed at every 12$^{th}$ iteration of the attack. It was observed that estimating the error rate using such a small number of patterns can be misleading and can result in premature termination of the AppSAT attack, even for circuits with high corruptibility. Table 5 below shows that the "default" AppSAT attack terminates erroneously for all of the SFLL, circuits, failing to retrieve the correct netlist.

TABLE 5

AppSAT (see, e.g., Reference 40) attack results (with default AppSAT setting) against SFLL-HD$^h$ and SFLL-flex$^{c \times k}$. Only 50 random queries are applied as per the default AppSAT settings (see, e.g., Reference 40). The attack fails to retrieve the correct key, and thus, we report it as failure.

| Benchmark | s35932 | s38584 | s38417 | b14 | b15 | b17 | b18 | b20 | b21 | b22 |
|---|---|---|---|---|---|---|---|---|---|---|
| Success/failure | Fail | Fail | Fail | Fail | Fail | Fail | Fail | Fail | Fail | Fail |

Figure 16:
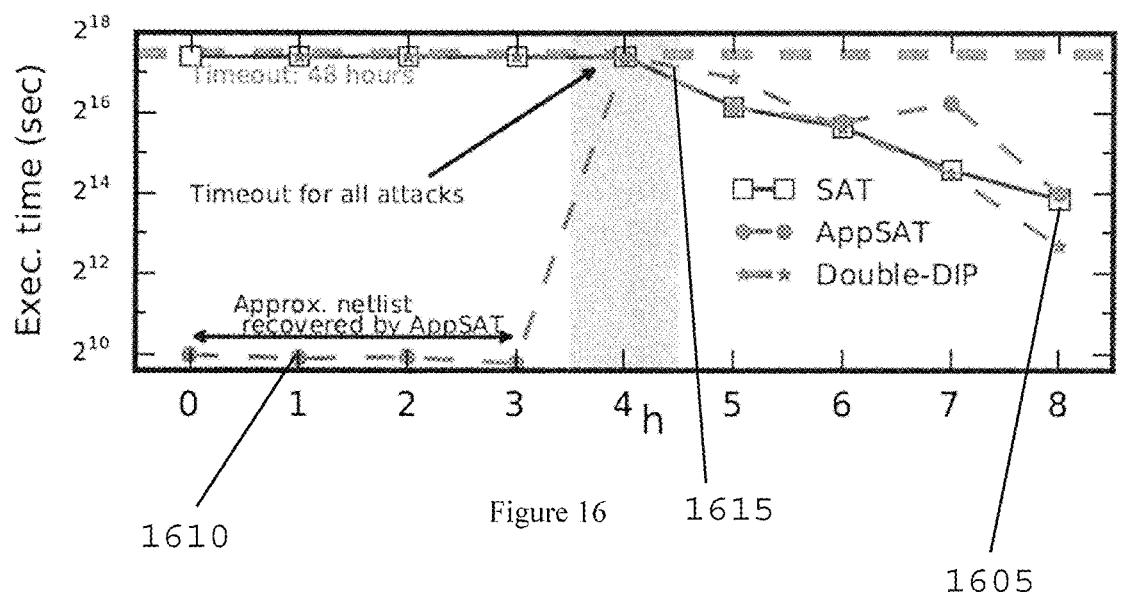
FIG. 16 is an exemplary chart illustrating the execution time of the SAT, AppSAT, and Double-DIP attack according to an exemplary embodiment of the present disclosure.

For more realistic corruptibility estimates, the exemplary experiments were repeated on s38417 SFLL-HD circuit with 32 key bits. 1000 random queries were applied after every 12 iterations. FIG. 16 shows that for h≤3, the attack terminated quickly, recovering an approximate netlist for SAT 1605, AppSAT 1610 and Double-Dip 1615. However, for the same h values, the SAT attack 1605 failed to complete within the time limit of 48 hours. Moreover, for the larger values of h, representing higher corruptibility, AppSAT 1610 behaves exactly like the SAT attack 1605, failing to retrieve an approximate netlist. For example, for h=4 (e.g., implying security level of $$32 - \left\lceil \log_2 \binom{32}{4} \right\rceil = 15 \text{ bits}\right),$$

both AppSAT 1610 and the SAT attack 1605 fail to succeed within the time limit of 48 hours. Note that due to the inclusion of the random queries, and additional clauses in the SAT formula, the execution time of AppSAT 1610 can be occasionally higher than that of the SAT attack 1605.

Exemplary Trade-Off: Resilience to Different Attacks

Figures 17A, 17B:
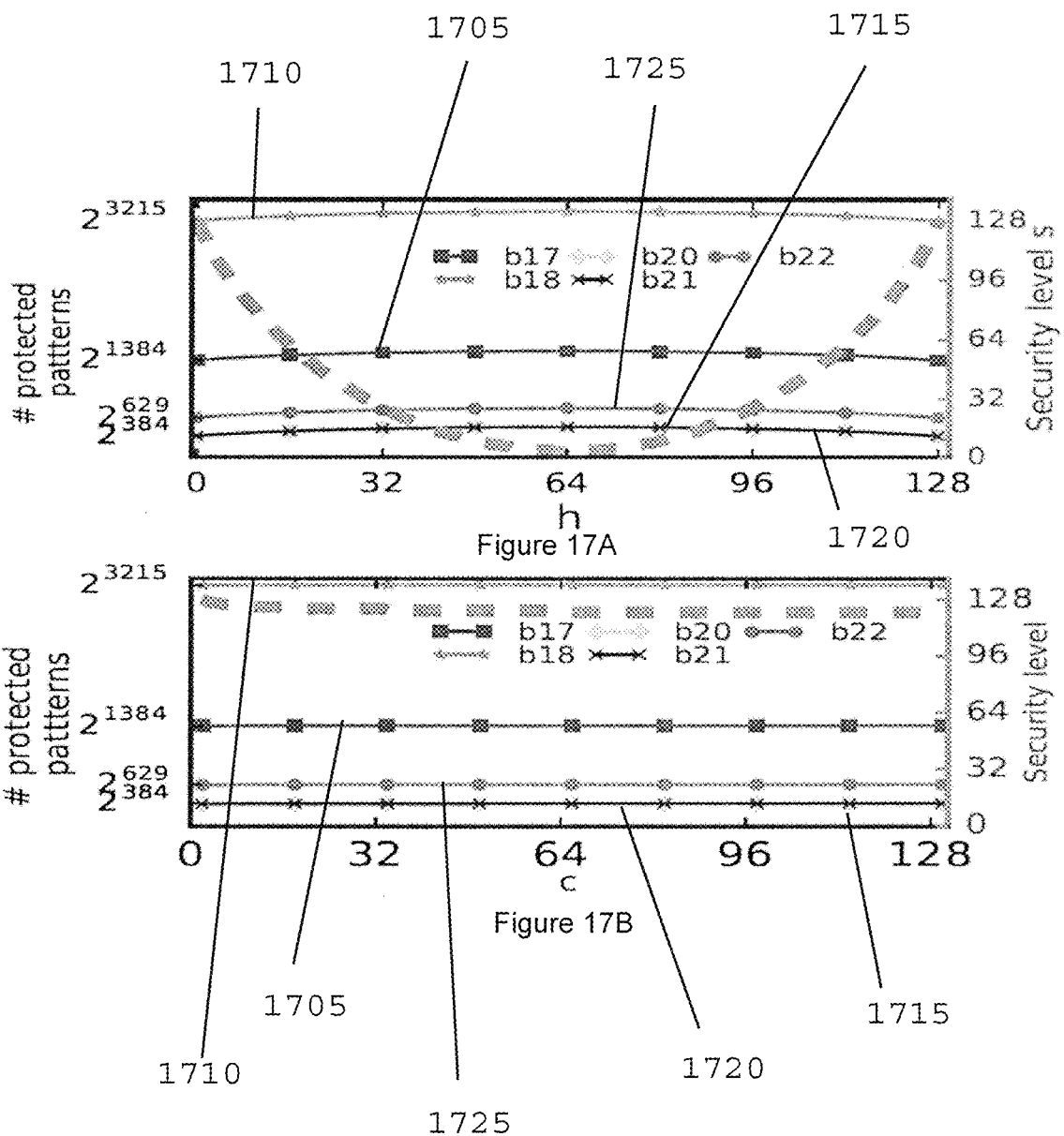
FIG. 17A is an exemplary graph illustrating a SAT attack resilience versus removal attack resilience for SFLL-HD$^h$ according to an exemplary embodiment of the present disclosure.
FIG. 17B is an exemplary graph illustrating a SAT attack resilience versus removal attack resilience for SFLL-flex$^{c \times k}$ according to an exemplary embodiment of the present disclosure.

FIGS. 17A and 17B show graphs that illustrate the wide spectrum of solutions offered by the exemplary SFLL-HD and SFLL-flex procedures; they show the trade-off between the removal attack resilience (e.g., in terms of the number of protected input patterns) and the security level s against oracle-guide (e.g., SAT) attacks for the largest five benchmark circuits. For example, FIGS. 17A and 17B illustrate b17 (element 1705), b18 (element 1710), b20 (element 1715), b21 (element 1720) and b22 (element 1725). It can be observed that for SFLL-HD$^h$, the security-level s attained against SAT attacks can vary polynomially with h(h∈[0, k]); the larger the number of protected patterns, the lower the security level. The security level can depend only on k and h, irrespective of the circuit. For the maximum number of protected patterns, for example, h=n/2, the security level s can be minimal. The security level can be at its maximum at h=0 or h=k.

For SFLL-flex$^{c \times k}$, however, s can decrease only logarithmically with c(s=k-⌈log$_2$c⌉). As an example, for c=128 cubes, the security levels attained can be 121, irrespective of the circuit. The number of protected patterns can increase linearly with c. For example, for the circuit b20, the number of protected patterns increases from $2^{384}$ for c=1 to $2^{391}$ for c=128.

Both variants of the exemplary SELL can facilitate the protection of a large number of input patterns. While SFLL-HD can facilitate the designer to choose only the secret key value and the Hamming distance h, SFLL-flex can facilitate him/her to specify the complete set of input cubes to be protected.

Exemplary Silicon Implementation of SFLL-HD$^0$ On Arm Cortex-M0 Processor

With the objective of deploying SFLL for IoT applications, the details of silicon implementation of SFLL on an in-house designed microcontroller using ARM Cortex-M0 microprocessor are discussed below. (See, e.g., Reference 2). For accurate comparisons, both the baseline and the SFLL-locked microcontroller were fabricated. Cortex-M0 belongs to the family of Cortex-M 32-bit RISC processor series from ARM, suitable for a variety of low-cost microcontrollers. The microcontroller includes ARM AHB-Lite as its BUS, UART interface, and 64 KB of SRAM.

Exemplary Logic Locking on ARM Cortex-M0

The baseline ARM Cortex-M0 was locked using 128-bit SFLL-HD$^0$ along with 128-bit FLL. (See, e.g., Reference 36). FLL can be a procedure used to achieve high output corruptibility, while the exemplary SFLL can ensure security against any SAT-based attack. In the exemplary implementation, the program counter ("PC") was locked to safeguard against unauthorized execution. This ensures that an attacker with an incorrect key would end up with an incorrect execution due to the corrupted PC. The secret key can be stored in a tamper-proof memory, such as one-time programmable fuse ROM. However, in the exemplary implementation, the 256-bit key for the locked processor can be stored in a write-only configuration register. The locked processor can be activated by loading the secret key onto the configuration register through UART.

Exemplary Chip Design/Fabrication Flow.

Figure 19:
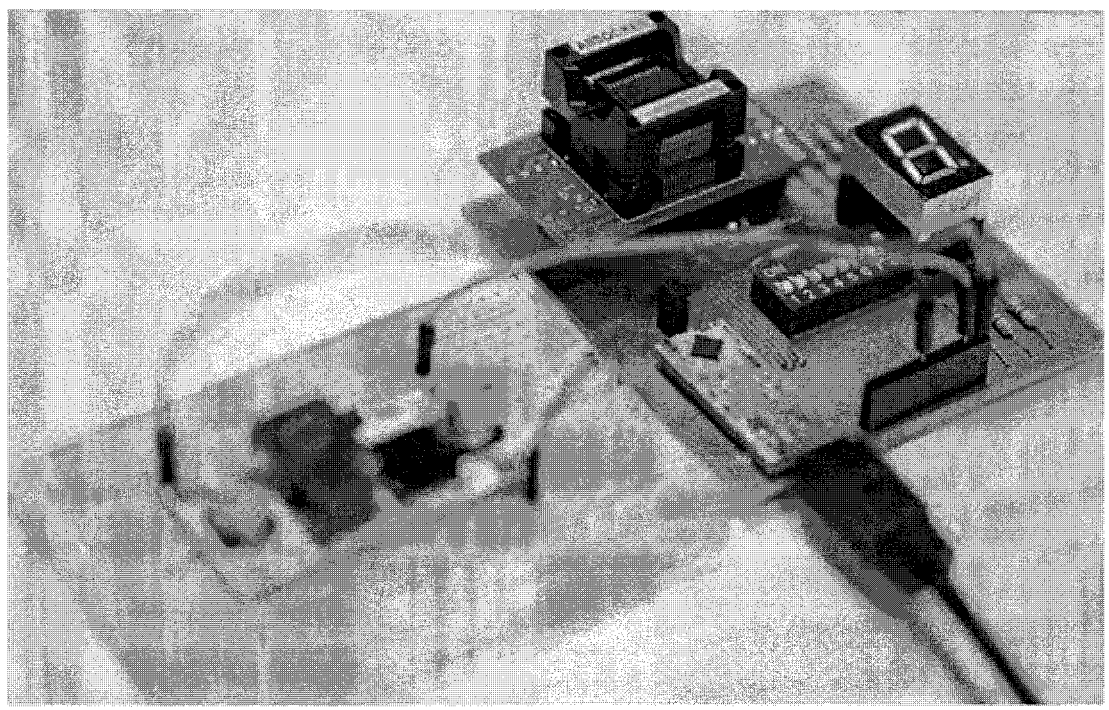
FIG. 19 is an exemplary image of a test setup for a baseline and locked processor according to an exemplary embodiment of the present disclosure.

Synopsys VCS was used for simulation, Synopsys Design Compiler was used for RTL synthesis, Synopsis IC Compiler was used for back-end implementation, Synopsys Prime Time was used for static timing analysis, Synopsys Formality was used for logical equivalence checking, PrimeRail was used for IR drop analysis, and Cadence PVS was used for physical verification. The baseline and the locked versions with the maximum frequency of 100 MHz were fabricated using Global Foundries 65 nm LPe process. A microscopic view of the bare dies for the baseline and the locked versions are shown in exemplary images of FIGS. 18A and 18B, respectively. FIG. 19 illustrates an exemplary image that provides an exemplary test setup for the chip. The APD overhead along with other parameters for the baseline and locked processors are shown in Table 6 below. The exemplary 128-bit FLL+128-bit SFLL-HD$^0$ can incur a minimal overhead of about 2.16%, about 5.62%, and about 5.38% for area, power, and delay, respectively, when compared to the baseline design.

TABLE 6

Baseline ARM Cortex-M0 vs. locked ARM Cortex-M0 (128 – bit FLL + 128 – bit SFLL HD$^0$).

| | Baseline | Locked | Overhead (%) |
|---|---|---|---|
| Gate count | 46800 | 51397 | 9.82 |
| RAM area (μm$^2$) | 349240 | 349240 | 0 |
| Combinational area (μm$^2$) | 61404 | 70765 | 15.24 |

TABLE 6-continued

Baseline ARM Cortex-M0 vs. locked ARM Cortex-M0 (128 − bit FLL + 128 − bit SFLL HD⁰).

|  | Baseline | Locked | Overhead (%) |
|---|---|---|---|
| Sequential area ($\mu m^2$) | 36876 | 37169 | 0.79 |
| IO pads, ($\mu m^2$) | 150000 | 150000 | 0 |
| Wirelength ($\mu m$) | 985233 | 1060502 | 7.64 |
| Overall area ($\mu m^2$) | 597521 | 607175 | 1.62 |
| Power ($\mu W$) | 6.66 | 7.03 | 5.62 |
| Delay (ns) | 8.00 | 8.43 | 5.38 |

Other implementation parameters, such as RAM size, combinational/sequential area, or wirelength can demonstrate that the two versions of the processor can be quite similar. The most significant difference can be in the combinational area, which can be about 15.2%. This increase in area for the locked processor can be attributed to the key gates introduced by FLL, and the restore unit introduced by SFLL. The additional routing resources utilized for the additional logic translate into a wirelength overhead of 7.6%

Exemplary Security Analysis

The exemplary locked processor can protect against all oracle-guided attacks. The sensitization attack (see, e.g., Reference 34) can terminate in a few minutes but without returning the correct key. When the SAT attack (see, e.g., Reference 44) can be launched on the locked processor, the attack does not terminate within the specified time limit of 48 hours. Since compound logic locking (e.g., SFLL+FLL) was implemented on the processor, the AppSAT attack (see, e.g., Reference 40) would be able to reduce the compound logic locking problem to SFLL alone; indeed the AppSAT attack on the locked processor terminates after 46 hours, but fails to identify the SFLL key.

Exemplary Operation of the Locked Processor

The exemplary code below that performs one addition operation to explain the impact of logic locking (e.g., hardware-level protection) on processor operations (e.g., software execution) can be used.

```
int a,b;
GPCFG->SPARE0=0x0000000F;
GPCFG->SPARE1=0x00000001;
a=GPCFG->SPARE0;
b=GPCFG->SPARE1;
GPCFG->GPTACFG=a+b;
```

This C code can be compiled for the ARM Cortex-M0 using ARM IAR Embedded Workbench and the corresponding binary images can be loaded onto the SRAM via the UART interface. The activated processor (e.g., that has the secret key loaded on the chip) executes the code correctly as shown in an exemplary diagram of FIG. 20A; the addition of 0x01 and 0x0F produces 0x10 as expected. On the other hand, the locked processor (e.g., with an incorrect key loaded) cannot execute the code correctly, as shown in an exemplary diagram of FIG. 20B, as the program counter can be corrupted. An exception handler can then be called, resetting the PC to the default value of 0xFFF7_FFFE, causing the execution to go into an infinite loop.

Exemplary Discussion

Exemplary Comparative Security Analysis

Table 7 below shows an exemplary comparison of SFLL-HD and SFLL-flex with other logic locking procedures. Existing SAT attack resilient procedures such as SARLock and Anti-SAT can be vulnerable to removal attacks. The exemplary SFLL thwarts all known attacks on logic locking. Further, it facilitates a designer to cost-effectively explore the trade-off between resilience to SAT and removal attacks.

TABLE 7

Comparative security analysis of logic locking techniques against existing attacks

| Attack/Defense | Anti-SAT [52] | SARLock [55] | TTLock [61] | SFLL-HD$^h$ | SFLL-flex$^{c \times k}$ |
|---|---|---|---|---|---|
| SAT | k-secure | k-secure | k-secure | $\left[k - \log_2\binom{k}{h}\right]$-secure | $(k - \lceil \log_2 c \rceil)$-secure |
| Sensitization | k-secure | k-secure | k-secure | k-secure | k-secure |
| Removal | 0-resilient | 0-resilient | $2^{n-k}$-resilient | $\binom{k}{h} \cdot 2^{n-k}$-resilient | $c \cdot 2^{n-k}$-resilient |

SFLL is secure against all attacks. Various version of SFLL offer a trade-off between SAT attack resilience and removal attack resilience.

Exemplary Choosing Between SFLL-HD and SFLL-Flex

While SFLL-HD can be suitable for generic applications where the main requirement can be to protect a large number of input patterns with minimal overhead, SFLL-flex can facilitate a designer to protect specific input cubes. The capability to specify IP-critical cubes to protect, even a small number of them, can be very beneficial for applications such as microprocessors with IP-critical controllers, digital signal processing applications with IP-critical coefficients, etc. The flexibility required in SFLL-flex necessitates a slightly more expensive restore unit mainly due to the LUT, compared to SFLL-HD, which has a generic, simple, and scalable restore unit. In either case, the security-aware synthesis framework can facilitate the designer to attain the desired security level.

Exemplary Resilience Against the Derivative Attacks

These attacks mainly target compound (e.g., multi-layered) logic locking procedures. AppSAT and Double-DIP can be approximate attacks as they only reduce a compound logic locking procedure (e.g. SARLock+SLL) to a SAT attack resilient procedure (e.g. SARLock). The Bypass attack, however, can be an exact attack; the attack, if successful, returns a netlist functionally equivalent to the oracle (e.g., functional IC).

These attacks can rely on the classification of compound logic locking key bits into two classes: key bits for RLL/SLL etc. that introduce high corruptibility and key bits for SARLock/Anti-SAT etc. that induce low corruptibility at the outputs. These attacks can quickly determine the correct values for the high corruptibility key bits. The AppSAT and Double-DIP attacks can then assign a random value for the low corruptibility key bits, whereas, the Bypass attack can introduce additional logic to fix the occasional corruption at the outputs. These attacks may not be effective against the exemplary SFLL as all the key bits in SFLL can incur uniform corruptibility and it may not be feasible to partition the key search space into low/high corruptibility regions.

There can be two primary differences between the AppSAT and the SAT attack. First, AppSAT can be constructed by augmenting the SAT attack with random queries to the oracle at regular intervals. AppSAT includes, e.g., 50 random queries every 12 iterations of the attack. (See, e.g., Reference 40). Second, AppSAT can terminate much earlier than the SAT attack, for example, when the error rate, or Hamming distance at the outputs, can be below a certain threshold $$\left(\text{e.g., } \frac{1}{2^k}\right).$$

While the AppSAT attack can quickly recover an approximate netlist for low-corruptibility SFLL circuits (e.g., with low h or c), it behaves similarly to the SAT attack for high-corruptibility SFLL circuits since the early termination condition may not be satisfied. Thus, SFLL resilience against AppSAT can be similar to that against the SAT attack.

The 50 queries as per the default AppSAT settings can be sufficient to separate the key bits into two classes in case of compound locking procedures. However, no such classes of key bits exist in SFLL where the corruptibility can be uniform for all the key values. When the attack was launched on SFLL circuits with varying corruptibility values (e.g., represented using h), the attack terminated erroneously even for high corruptibility circuits. The error can be better estimated with 1000 random queries. The attack then quickly extracts the approximate netlist for the smaller values of h. For the larger h values, the attack performance can be similar to that of the SAT attack.

Exemplary Double-DIP.

Compared to the SAT attack, the Double-DIP attack uses a larger miter circuit comprising four copies of the locked netlist. (See, e.g., Reference 41). The 2-DIPs computed by the attack eliminate at least two incorrect keys per DIP. The attack terminates when no more 2-DIPs can be found, implying that only DIPs that can eliminate at most one incorrect key remain in the search space. The attack returns an approximate netlist. While the attack can break compound logic locking procedures, it may not be scalable, especially if the locked circuit has multiple correct keys.

Except for SFLL-HD$^0$ or SFLL-flex$^{1 \times k}$ (e.g., where there may be no 2 DIPs), the Double-DIP attack, when launched on SFLL circuits, can run into scalability issues as it can compute an exponential number of DIPs before it terminates. Rarely, when the attack is fortuitous and selects one of the protected patterns as a DIP (e.g., the protected pattern can be a 2-DIP), it can eliminate most of the incorrect keys in a single iteration of the attack. In such cases, the attack returns the exact netlist, similar to the basic SAT attack, but this can be highly unlikely for large enough key sizes.

Exemplary Bypass. The Bypass attack generally selects two random key values as constraints for the two locked netlists in the miter circuit. (See, e.g., Reference 53). The attack then computes all the DIPs that result in differing outputs for the two key values. For the traditional low corruptibility locking procedures such as SARLock, only a few DIPs can be extracted. The attacker then determines the correct key values for those DIPs from the output of functional IC. One of the two key values can be designated as the secret key and an additional bypass circuit can be added around the locked netlist to fix the output for the selected DIPs.

In SFLL, a protected input pattern produces the same incorrect output for most of the incorrect key values. Occasionally, the output can be correctly restored even for incorrect key values, as shown in FIG. 4. When applied to SFLL, the Bypass attack fails to compute the complete set of DIPs that lead to incorrect outputs for the two key values. Most of the DIPs yield exactly the same incorrect output for both incorrect keys, and as such, cannot be extracted using the miter construction employed by the Bypass attack. The bypass circuitry, when constructed using an incomplete set of DIPs, can be erroneous.

Optical/SEM Imaging of the Chips

A microscopic view of the bare dies of the baseline and locked versions are shown in FIGS. 18A and 18B, respectively, using an optical microscope. The I/O openings for the chips are clearly shown. Identical structures were observed for both the baseline and the locked versions, yet there can be minute differences between the two versions though not visible.

Figure 21:
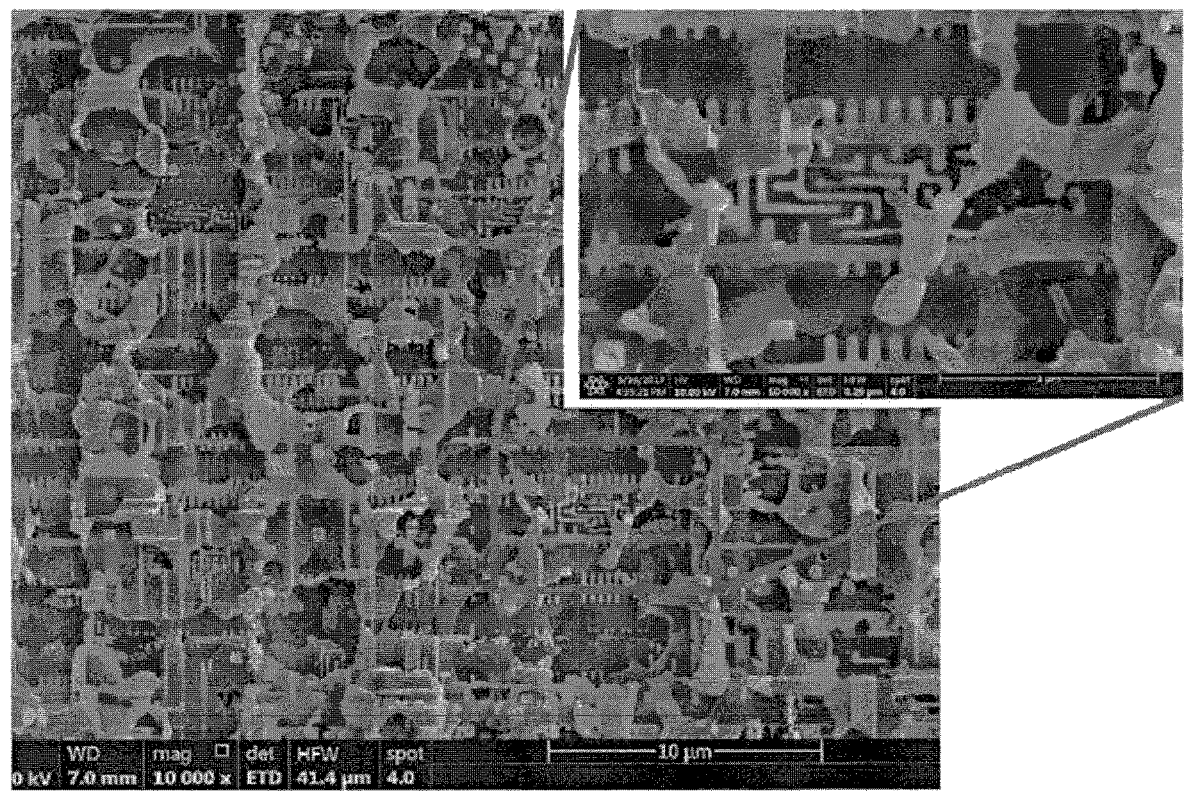
FIG. 21 is an image generated using a scanning electron microscope of a milled chip showing the area where a portion of a protection unit was inserted into the chip according to an exemplary embodiment of the present disclosure.

Further, a scanning electron microscope ("SEM") image of the locked version is shown in FIG. 21 where a particular area of the chip can be milled out to spot part of the protection unit (e.g., shown in the inset) used to lock the processor. The chip was sectioned using an FEI Scios focused ion beam ("FIB") system. The first milling stage involved removing 5 microns of the top layer over a 100 by 100 micron area using the Galium beam at 30 kV/15 nA. Afterward, 250 nm, or thinner, slices were removed at a lower current 7 nA. Imaging was performed using the electron beam using both secondary and hack-scattered electrons (e.g., ETD and T1) detectors. This mill-and-image process can be an attempt to mimic the reverse engineering capabilities of an attacker to obtain the netlist of the device. In fact, an attacker would rather use etching to delayer individual metal layers until he/she reaches the substrate layer. In the exemplary experiments, FIB-SEM was used to mill until the substrate layer was exposed and the gates used for logic locking can be visible.

Exemplary Proofs n inputs and k key bits can be assumed, where k≤n.

B.1 SFLL-HD$^h$ $$\text{SFLL-HD}^h \text{ is } \left(k - \left\lceil \log_2\binom{k}{h} \right\rceil\right)\text{-secure against } SAT \text{ attack.}$$

For SFLL-HD$^h$, $$|P| = \binom{k}{h} \text{ and } |\hat{P}| = 2^k - \binom{k}{h}.$$

Thus, for a PPT attacker oblivious to the protected input cubes, making only only polynomial number of queries q(k), the success probability can be given by Eq. 2, $$\frac{|P|}{2^k} + \frac{|P|}{2^k - 1} \cdots \frac{|P|}{2^k - q(k)}$$

-continued $$= \frac{\binom{k}{h}}{2^k} + \frac{\binom{k}{h}}{2^k - 1} \cdots \frac{\binom{k}{h}}{2^k - q(k)}$$

$$\approx \frac{q(k) \cdot \binom{k}{h}}{2^k}$$

$$< \frac{q(k)}{2^k - \left\lceil \log_2 \binom{k}{h} \right\rceil}$$

Thus, from the above, SFLL-HD$^h$ can be $$\left(k - \left\lceil \log_2 \binom{k}{h} \right\rceil\right)$$

-secure against the SAT attack can be achieved.

SFLL-HD$^h$ is k-Secure Against Sensitization Attack.

Similar to SFLL-HD$^0$, all the k bits of SFLL-HD$^h$ converge within the comparator inside the restore unit to produce the restore signal. Therefore, sensitizing any key bit through the restore signal to the output utilizes controlling all the other key bits. All k bits can be therefore pairwise-secure. SFLL-HD$^h$ can be k-secure against sensitization attack.

SFLL-HD$^h$ is $2^{n-k} \cdot \binom{k}{h}$-resilient against removal attack.

As the restore signal can be skewed towards 0, it can be identified by a signal probability skew ("SPS") attack. The attacker can then be able to recover the FSC, denoted as $ckt_{rec}$ which produces erroneous output for the set of protect input patterns $\Gamma$. Similar to the above, from Eq. 3, the following can be achieved, $$|\Gamma| = |P| \times 2^{n-k}$$

$$= \binom{k}{h} \times 2^{n-k}$$

Thus, from the above, SFLL-HD$^h$ can be $$2^{n-k} \cdot \binom{k}{h}$$

-resilient against a removal attack can be achieved.

Exemplary SFLL-Flex$^{c \times k}$

SFLL-Flex$^{c \times k}$ is (k−⌊log$_2$c⌋)-Secure Against SAT Attack.

For SFLL-flex$^{c \times k}$, the cardinality of the set of protected cubes P can be |P|=c. Thus, from Eq. 2, the success probability of a PPT adversary making a polynomial number of queries q(k) can be given by, for example:

$$\frac{|P|}{2^k} + \frac{|P|}{2^k - 1} \cdots \frac{|P|}{2^k - q(k)}$$

$$= \frac{c}{2^k} + \frac{c}{2^k - 1} \cdots \frac{c}{2^k - q(k)}$$

$$\approx \frac{q(k) \cdot c}{2^k}$$

$$< \frac{q(k)}{2^k - \lceil \log_c 2 \rceil}$$

Thus, from the above, SFLL-HD$^{c \times k}$ can be (k−⌊log$_2$c⌋)-secure against the SAT attack can be achieved.

SFLL-Flex$^{c \times k}$ is k-Secure Against Sensitization Attack

All the k bits of SELL-flex$^{c \times k}$ converge within the comparator inside the LUT to produce the signal that asserts the XOR vector operation between the flip vector and the outputs. Therefore, sensitizing any key bit through the LUT to any of the outputs utilizes controlling all the other key bits. All k bits can therefore be pairwise-secure. SFLL-flex$^{c \times k}$ can be k-secure against sensitization attack.

SFLL-Flex$^{c \times k}$ is $c \cdot 2^{n-k}$-Resilient Against Removal Attack

Even if the LUT along with its surrounding logic can be identified by a reverse-engineer, he/she can only recover the FSC denoted as $ckt_{rec}$. However, $ckt_{rec}$ produces incorrect output for the protected input patterns $\Gamma$. Thus, for example:

$$ckt_{rec}(i) \neq F(i), \forall\, i \in \Gamma$$

$$|\Gamma| = |P| \times 2^{n-k}$$

$$= c \cdot 2^{n-k}$$

Thus, from the above, SFLL-HD$^{c \times k}$ can be $c \cdot 2^{n-k}$-resilient against a removal attack can be achieved.

Exemplary Conclusion

An exemplary stripped-functionality logic locking can be used, which can include a low-cost, secure, and scalable logic locking procedure that can thwart most or all known and anticipated attacks. The resilience of any logic locking procedure can be quantified against a given attack in terms of the number and the size of the protected input cubes. Based on this finding, CAD framework was developed that can facilitate the designer to strip functionality from the hardware implementation of the design based on a set of input cubes to be protected; a security-aware synthesis process can also be used that can strip functionality with the objective of minimizing the cost of implementation. By adjusting the number and the size of the protected cubes, the designer can explore the trade-off between resilience to different attacks. The stripped functionality can be hidden from untrusted entities, such as the foundry and the end-user (e.g., potential reverse-engineer). Only the secret key, for example, the protected cubes, can successfully recover the stripped functionality through an on-chip restore operation.

Another flexibility that the exemplary framework offers can be that for general applications, it facilitates the designer to protect any number of a restricted set of cubes, leading to a simple and scalable architecture. It also supports specialized applications that utilized IP-critical input cubes to be protected. The designer can thus choose the solution that best fits the security needs of his/her application.

Upon implementing the exemplary logic locking procedure on large-sized benchmarks (e.g., greater than about 100K gates) and launching all known attacks on them, it was confirmed that the exemplary procedure can be secure and cost-efficient. For further validation, the exemplary logic locking procedure was applied on an industry-strength microprocessor design that was then implement in silicon; the data obtained from the fabricated chips also confirm the practicality, security, and scalability of the exemplary procedure. The exemplary procedure can be seamlessly integrated into the IC design flow to thwart IP piracy, reverse engineering, and overbuilding attacks.

Figure 22:
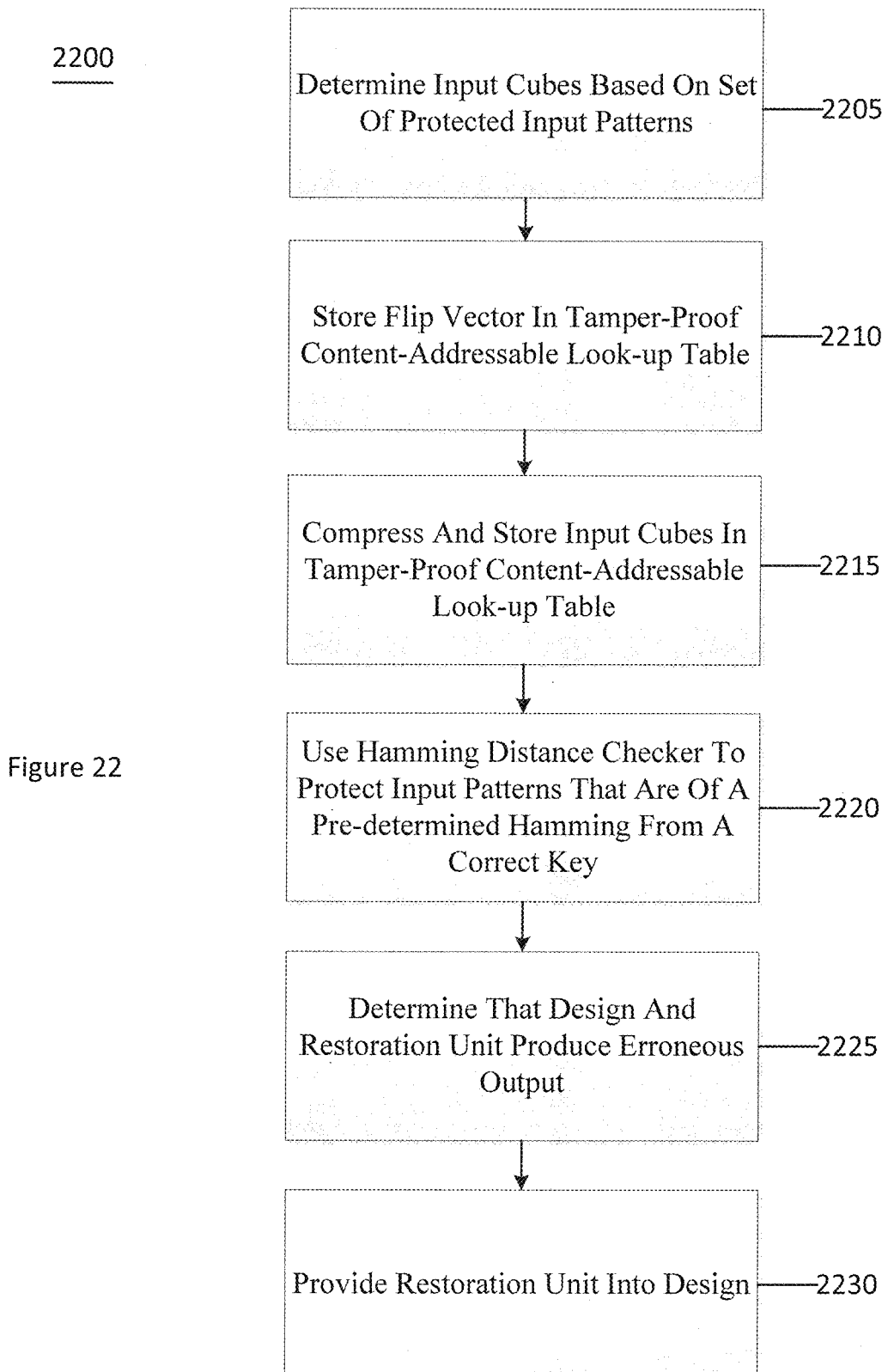
FIG. 22 is an exemplary flow diagram of a method for modifying a design of an integrated circuit according to an exemplary embodiment of the present disclosure.

FIG. 22 shows an exemplary flow diagram of a method 2200 for modifying a design of an IC according to an exemplary embodiment of the present disclosure. For example, at procedure 2205, input cubes can be determined based on a set of protected input patterns. At procedure 2210, flip vectors can be stored in a tamper-proof content-addressable look-up table. At procedure 2215, input cubes can be compressed and then stored in the tamper-proof content-addressable look-up table. At procedure 2220, a Hamming distance checker can be used to protect input patterns that of a pre-determined Hamming distance away from a correct key. At procedure 2225, a determination can be made as to whether the design and the restoration unit produce an erroneous output. At procedure 2230, the restoration unit can be provided in the design.

Figure 23:
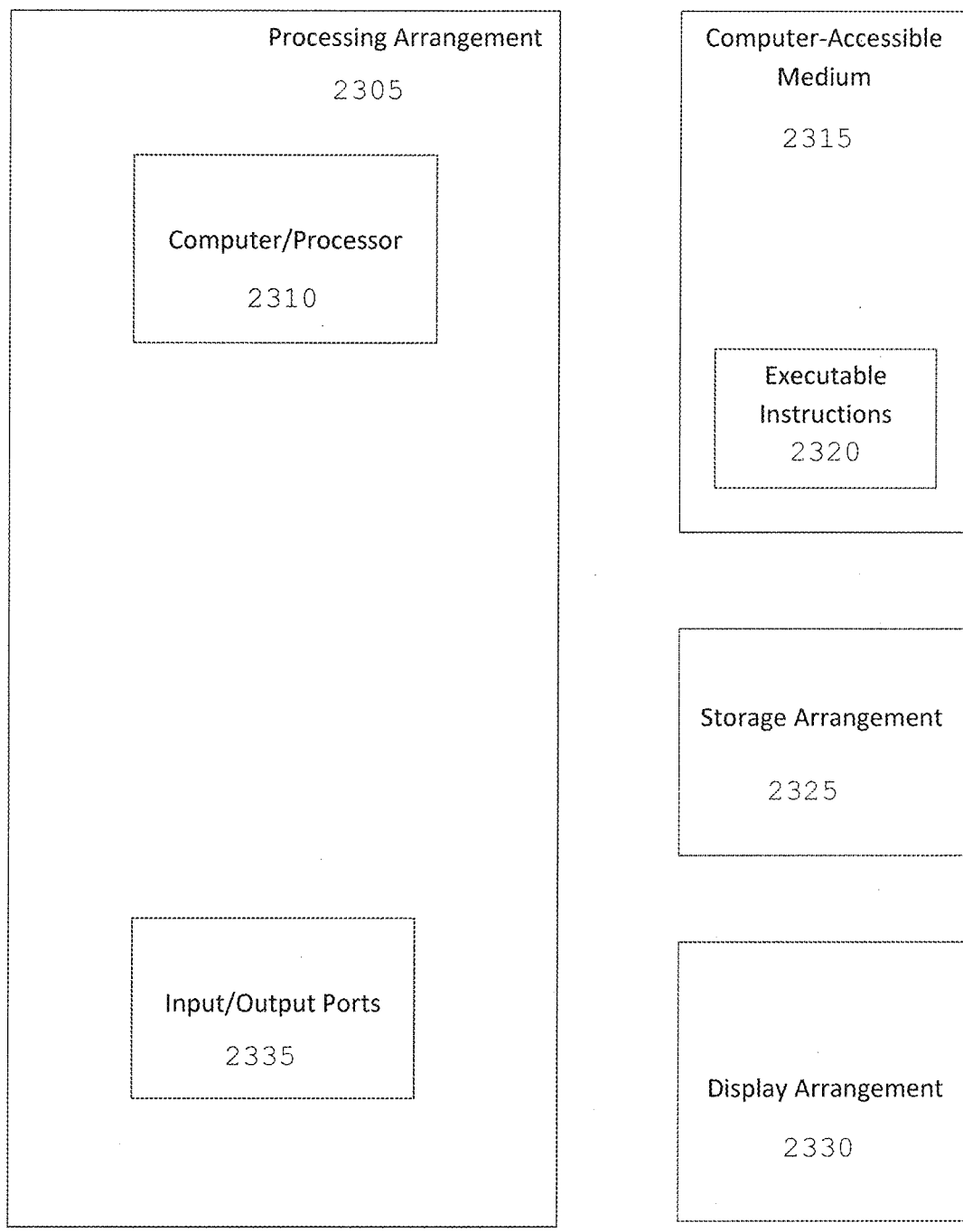
FIG. 23 is an illustration of an exemplary block diagram of an exemplary system in accordance with certain exemplary embodiments of the present disclosure.

FIG. 23 shows a block diagram of an exemplary embodiment of a system according to the present disclosure. For example, exemplary procedures in accordance with the present disclosure described herein can be performed by a processing arrangement and/or a computing arrangement 2305. Such processing/computing arrangement 2305 can be, for example entirely or a part of, or include, but not limited to, a computer/processor 2310 that can include, for example one or more microprocessors, and use instructions stored on a computer-accessible medium (e.g., RAM, ROM, hard drive, or other storage device).

As shown in FIG. 23, for example a computer-accessible medium 2315 (e.g., as described herein above, a storage device such as a hard disk, floppy disk, memory stick, CD-ROM, RAM, ROM, etc., or a collection thereof) can be provided (e.g., in communication with the processing/computing arrangement 2305). The computer-accessible medium 2315 can contain executable instructions 2320 thereon. In addition or alternatively, a storage arrangement 2325 can be provided separately from the computer-accessible medium 2315, which can provide the instructions to the processing/computing arrangement 2305 so as to configure the processing/computing arrangement to execute certain exemplary procedures, processes, and methods, as described herein above, for example.

Further, the exemplary processing arrangement 2305 can be provided with or include an input/output ports 2335, which can include, for example a wired network, a wireless network, the internet, an intranet, a data collection probe, a sensor, etc. As shown in FIG. 23, the exemplary processing arrangement 2305 can be in communication with an exemplary display arrangement 2330, which, according to certain exemplary embodiments of the present disclosure, can be a touch-screen configured for inputting information to the processing arrangement in addition to outputting information from the processing arrangement, for example. Further, the exemplary display arrangement 2330 and/or a storage arrangement 2325 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties:

[1] Y. Alkabani and F. Koushanfar. 2007. Active Hardware Metering for Intellectual Property Protection and Security. In *USENIX Security*. 291-306.

[2] ARM. 2013. Cortex-M0 Processor. (2013). https://www.arm.com/products/processors/cortex-m/cortex-m0.php

[3] J. P. Baukus, L. W. Chow, R. P. Cocchi, P. O., and B. J. Wang. 2012. Building Block for a Secure CMOS Logic Cell Library. (2012). U.S. Pat. No. 8,111,089.

[4] J. P. Baukus, L. W. Chow, R. P. Cocchi, and B. J. Wang. 2012. Method and Apparatus for Camouflaging a Standard Cell based Integrated Circuit with Micro Circuits and Post Processing. (2012). US Patent no. 20120139582.

[5] A. Baumgarten, A. Tyagi, and J. Zambreno. 2010. Preventing IC Piracy Using Reconfigurable Logic Barriers. *IEEE Des. Test. Comput.* 27, 1 (2010), 66-75.

[6] R. Brayton and A. Mishchenko. 2010. ABC: An Academic Industrial-strength Verification Tool. In *International Conference on Computer Aided Verication*. Springer, 24-40.

[7] F. Brglez, D. Bryan, and K. Kozminski. 1989. Combinational Profiles of Sequential Benchmark Circuits. In *IEEE International Symposium on Circuits and Systems*. 1929-1934.

[8] Q. Chen, A. M. Azab, G. Ganesh, and P. Ning. 2017. PrivWatcher: Non-bypassable Monitoring and Protection of Process Credentials from Memory Corruption Attacks. In *ACM Asia Conference on Computer and Communications Security*. 167-178.

[9] Chipworks. 2012. Intel's 22-nm Tri-gate Transistors Exposed. http://www.chipworks.com/blog/technologyblog/2012/04/23/intels-22-nm-tri-gate-transistors-exposed/. (2012).

[10] S. Chu and C Burrus. 1984. Multirate filter designs using comb filters. *IEEE Transactions on Circuits and Systems* 31, 11 (1984), 913-924.

[11] S. Davidson. 1999. Notes on ITC'99 Benchmarks. http://www.cerc.utexas.edu/itc99-benchmarks/bendoc1.html. (1999).

[12] J. Diguet, S. Evain, R. Vaslin, G. Gogniat, and E. Juin. 2007. NOC-centric security of reconfigurable SoC. In *IEEE First International Symposium on Networks-on-Chip*. 223-232.

[13] C. Helfmeier, D. Nedospasov, C. Tarnovsky, J. S. Krissler, C. Boit, and J. P. Seifert. 2013. Breaking and Entering through the Silicon. In *ACM SIGSAC Conference on Computer and Communications Security*. 733-744.

[14] F. Imeson, A. Emtenan, S. Garg, and M. V. Tripunitara. 2013. Securing Computer Hardware Using 3D Integrated Circuit (IC) Technology and Split Manufacturing for Obfuscation. In *USENIX Conference on Security*. 495-510.

[15] Maxim Integrated. 2010. DeepCover Security Manager for Low-Voltage Operation with 1 KB Secure Memory and Programmable Tamper Hierarchy. https://www.maximintegrated.com/en/products/power/supervisors-voltage-monitors-sequencers/DS3660.html/tb_tab0. (2010).

[16] R. W. Jarvis and M. G. McIntyre. 2007. Split Manufacturing Method for Advanced Semiconductor Circuits. (2007). U.S. Pat. No. 7,195,931.

[17] A. B. Kahng, J. Lach, W. H Mangione-Smith, S. Mantik, I. L. Markov, M. Potkonjak, P. Tucker, H. Wang, and G. Wolfe. 1998. Watermarking Techniques for Intellectual Property Protection. In *IEEE/ACM Design Automation Conference*. 776-781.

[18] A. B. Kahng, S. Mantik, I. L. Markov, M. Potkonjak, P. Tucker, Huijuan Wang, and G. Wolfe. 1998. Robust IP watermarking methodologies for physical design. *Design Automation Conference* (1998), 782-787.

[19] M. Kammerstetter, M. Muellner, D. Burian, D. Platzer, and W. Kastner. 2014. Breaking Integrated Circuit Device Security Through Test Mode Silicon Reverse Engineering. In *ACM SIGSAC Conference on Computer and Communications Security*. 549-557.

[20] R. Karri, J. Rajendran, K. Rosenfeld, and M. Tehranipoor. 2010. Trustworthy Hardware: Identifying and Classifying Hardware Trojans. *Computer* 43, 10 (2010), 39-46.

[21] D. Kirovski and M. Potkonjak. 2003. Local watermarks: methodology and application to behavioral synthesis. *IEEE Transactions on Computer-Aided Design of Integrated Circuits and Systems* 22, 9 (2003), 1277-1283.

[22] F. Koushanfar. 2012. Provably Secure Active IC Metering Techniques for Piracy Avoidance and Digital Rights Management. *IEEE Trans. Inf. Forensics Security* 7, 1 (2012), 51-63.

[23] F. Koushanfar and G. Qu. 2001. Hardware Metering. In *IEEE/ACM Design Automation Conference*. 490-493.

[24] S. Kumar, S. Dharmapurikar, F. Yu, P. Crowley, and J. Turner. 2006. Algorithms to accelerate multiple regular expressions matching for deep packet inspection. In *ACM SIGCOMM Computer Communication Review*, Vol. 36. 339-350.

[25] H. K. Lee and D. S. Ha. 1993. Atalanta: an Efficient ATPG for Combinational Circuits. In *Technical Report*.

[26] S. Leef. 2017. In Pursuit of Secure Silicon. http://textlab.io/doc/22959027/mr.-serge-leef--vp-new-ventures--mentor-graphics. (2017).

[27] M. Li, K. Shamsi, T. Meade, Z. Zhao, B. Yu, Y. Jin, and D. Z. Pan. 2016. Provably Secure Camouflaging Strategy for IC Protection. In *IEEE/ACM International Conference on Computer-Aided Design*. 28:1-28:8.

[28] M. E. Massad, S. Garg, and M. V. Tripunitara. 2015. Integrated Circuit (IC) Decamouflaging: Reverse Engineering Camouflaged ICs within Minutes. In *Network and Distributed System Security Symposium*.

[29] M. E. Massad, J. Zhang, S. Garg, and M. V. Tripunitara. 2017. Logic Locking for Secure Outsourced Chip Fabrication: A New Attack and Provably Secure Defense Mechanism. *CoRR* ahs/1703.10187 (2017). http://arxiv.org/abs/1703.10187

[30] E. J. McCluskey. 1956. Minimization of Boolean functions. *Bell System Technical Journal* 35, 6 (1956), 1417-1444.

[31] A. L. Oliveira. 1999. Robust Techniques for Watermarking Sequential Circuit Designs. In *IEEE/ACM Design Automation Conference*. 837-842.

[32] T. S. Perry. 2017. Why Hardware Engineers Have to Think Like Cybercriminals, and Why Engineers Are Easy to Fool. (2017). http://spectrum.ieee.org/view-from-the-valley/computing/embedded-systems/why-hardware-engineers-have-to-think-like-cybercriminals-and-why-engineers-are-easy-to-fool

[33] S. M. Plaza and I. L. Markov. 2015. Solving the Third-Shift Problem in IC Piracy With Test-Aware Logic Locking. *IEEE Transactions on CAD of Integrated Circuits and Systems* 34, 6 (2015), 961-971.

[34] J. Rajendran, Y. Pino, O. Sinanoglu, and R. Karri. 2012. Security Analysis of Logic Obfuscation. In *IEEE/ACM Design Automation Conference*. 83-89.

[35] J. Rajendran, M. Sam, O. Sinanoglu, and R. Karri. 2013. Security Analysis of Integrated Circuit Camouflaging. In *ACM/SIGSAC Conference on Computer & Communications Security*. 709-720.

[36] J. Rajendran, Huan Zhang, Chi Zhang, G. S. Rose, Youngok Pino, O. Sinanoglu, and R. Karri. 2015. Fault Analysis-Based Logic Encryption. *IEEE Transactions on Computer* 64, 2 (2015), 410-424.

[37] M. Rostami, F. Koushanfar, and R. Karri. 2014. A Primer on Hardware Security: Models, Methods, and Metrics. *IEEE* 102, 8 (2014), 1283-1295.

[38] J. A. Roy, F. Koushanfar, and Igor L Markov. 2010. Ending Piracy of Integrated Circuits. *IEEE Computer* 43, 10 (2010), 30-38.

[39] SEMI. 2008. Innovation is at Risk Losses of up to $4 Billion Annually due to IP Infringement. (2008). www.semi.org/en/Issues/IntellectualProperty/ssLINK/P043785 [Jun. 10, 2015].

[40] K. Shamsi, M. Li, T. Meade, Z. Zhao, D. P. Z., and Y. Jin. 2017. AppSAT: Approximately Deobfuscating Integrated Circuits. In *to appear in IEEE International Symposium on Hardware Oriented Security and Trust*.

[41] Y. Shen and H. Zhou. 2017. Double DIP: Re-Evaluating Security of Logic Encryption Algorithms. Cryptology ePrint Archive, Report 2017/290. (2017). http://eprint.iacr.org/2017/290.

[42] J. P. Skudlarek, T. Katsioulas, and M. Chen. 2016. A Platform Solution for Secure Supply-Chain and Chip Life-Cycle Management. *Computer* 49, 8 (2016), 28-34.

[43] J. E. Stine, I. Castellanos, M. Wood, J. Henson, F. Love, W. R. Davis, P. D Franzon, M. Bucher, S. Basavarajaiah, J. Oh, et al. 2007. FreePDK: An Open-Source Variation-Aware Design Kit. In *IEEE International Conference on Microelectronic Systems Education*. 173-174.

[44] P. Subramanyan, S. Ray, and S. Malik. 2015. Evaluating the Security of Logic Encryption Algorithms. In *IEEE International Symposium on Hardware Oriented Security and Trust*. 137-143.

[45] P. Subramanyan, N. Tsiskaridze, K. Pasricha, D. Reisman, A. Susnea, and S. Malik. 2013. Reverse Engineering Digital Circuits Using Functional Analysis. *IEEE/ACM Design Automation and Test in Europe* (2013).

[46] SypherMedia. 2017. SypherMedia Library Circuit Camouflage Technology. http://www.smi.tv/syphermedia_library_circuit_camouflage_technology.html. (2017).

[47] TechInsights. 2017. Samsung Galaxy S8 (SM-G950 W) Teardown. http://www.techinsights.com/about-techinsights/overview/blog/samsung-galaxy-s8-teardown. (2017).

[48] M. M. Tehranipoor, U. Guin, and S. Bhunia. 2017. Invasion of the Hardware Snatchers. *IEEE Spectrum* 54, 5 (2017), 36-41.

[49] R. Torrance and D. James. 2011. The State-of-the-Art in Semiconductor Reverse Engineering. In *IEEE/ACM Design Automation Conference*. 333-338.

[50] P. Tuyls, G. Schrijen, B. Škorić, J. van Geloven, N. Verhaegh, and R. Wolters. 2006. Read-ProofHardware from Protective Coatings. In *International Conference on Cryptographic Hardware and Embedded Systems*, Louis Goubin and Mitsuru Matsui (Eds.). 369-383.

[51] A. Vijayakumar, V. C. Patil, D. E. Holcomb, C. Paar, and S. Kundu. 2017. Physical Design Obfuscation of Hardware: A Comprehensive Investigation of Device and Logic-Level Techniques. *IEEE Transactions on Information Forensics and Security* 12, 1 (2017), 64-77.

[52] Y. Xie and A. Srivastava. 2016. Mitigating SAT Attack on Logic Locking. In *International Conference on Cryptographic Hardware and Embedded Systems*. 127-146.

[53] X. Xu, B. Shakya, M. M. Tehranipoor, and D. Forte. 2017. Novel Bypass Attack and BDD-based Tradeoff Analysis Against all Known Logic Locking Attacks. Cryptology ePrint Archive, Report 2017/621. (2017). http://eprint.iacr.org/2017/621.

[54] M. Yasin, B. Mazumdar, S. S. Ali, and O. Sinanoglu. 2015. Security Analysis of Logic Encryption against the Most Effective Side-Channel Attack: DPA. In *IEEE International Symposium on Defect and Fault Tolerance in VLSI and Nanotechnology Systems*. 97-102.

[55] M. Yasin, B. Mazumdar, J. Rajendran, and O. Sinanoglu. 2016. SARLock: SAT Attack Resistant Logic Locking. In *IEEE International Symposium on Hardware Oriented Security and Trust*. 236-241.

[56] M. Yasin, B. Mazumdar, O. Sinanoglu, and J. Rajendran. 2016. CamoPerturb: Secure IC Camouflaging for Minterm Protection. *IEEE/ACM International Conference on Computer-Aided Design*, 29:1-29:8.

[57] M. Yasin, B. Mazumdar, O. Sinanoglu, and J. Rajendran. 2016. Security Analysis of Anti-SAT. *IEEE Asia and South Pacific Design Automation Conference* (2016), 342-347.

[58] M. Yasin, B. Mazumdar, O. Sinanoglu, and J. Rajendran. 2017. Removal Attacks on Logic Locking and Camouflaging Techniques. *IEEE Transactions on Emerging Topics in Computing* 99, 0 (2017), PP.

[59] M. Yasin, J. Rajendran, O. Sinanoglu, and R. Karri. 2016. On Improving the Security of Logic Locking. *IEEE Transactions on CAD of Integrated Circuits and Systems* 35, 9 (2016), 1411-1424.

[60] M. Yasin, S. M. Saeed, J. Rajendran, and O. Sinanoglu. 2016. Activation of Logic Encrypted Chips: Pre-test or Post-Test?. In *Design, Automation Test in Europe*. 139-144.

[61] M. Yasin, A. Sengupta, B. C. Schafer, Y. Makris, O. Sinanoglu, and J. Rajendran. 2017. What to Lock?: Functional and Parametric Locking. In *Great Lakes Symposium on VLSI*. 351-356.

[62] M. Yasin, O. Sinanoglu, and J. Rajendran. 2017. Testing the Trustworthiness of IC Testing: An Oracle-Less Attack on IC Camouflaging. *IEEE Transactions on Information Forensics and Security* 12, 11 (2017), 2668-2682.

[63] M. Yasin, T. Tekeste, H. Saleh, B. Mohammad, O. Sinanoglu, and M. Ismail. 2017. Ultra-Low Power, Secure IoT Platform for Predicting Cardiovascular Diseases. *IEEE Transactions on Circuits and Systems I: Regular Papers* PP, 99 (2017), 1-14.

What is claimed is:

1. A non-transitory computer-accessible medium having stored thereon computer-executable instructions for modifying a design of at least one integrated circuit (IC), wherein, when a computer arrangement executes the instructions, the computer arrangement is configured to perform procedures comprising:
    modifying at least one logic gate in the design for at least one protected input pattern, wherein the at least one protected input pattern is an input pattern for which the modified design produces a different output than an original design;
    providing at least one restoration unit into the design, wherein the at least one restoration unit is configured to (i) produce at least one error-free output when a correct secret key is applied to the at least one restoration unit, and (ii) produce at least one erroneous output when an incorrect key is applied to the at least one restoration unit; and
    performing at least one of:
        (i) determining that the design and the at least one restoration unit produce at least one erroneous output with respect an original design for only a pre-determined constant number of incorrect keys based on at least one input pattern, or
        (ii) modifying the at least one logic gate based on a security-aware synthesis procedure which is configured to reduce at least one design metric while ensuring that $k - \log_2 c$ is greater than a target security level, and wherein k is a key size and c is a number of cube.

2. The computer-accessible medium of claim 1, wherein the at least one restoration unit includes at least one Hamming Distance checker configured to check a Hamming Distance between the at least one input pattern and at least one key.

3. The computer-accessible medium of claim 2, wherein the computer arrangement is configured to use the at least one Hamming Distance checker to protect input patterns that are of a pre-determined Hamming Distance away from at least one correct key.

4. The computer-accessible medium of claim 3, wherein the at least one correct key is stored in a tamper-proof memory.

5. The computer-accessible medium of claim 1, wherein the at least one restoration unit includes a tamper-proof content-addressable look-up table.

6. The computer-accessible medium of claim 5, wherein the computer arrangement is further configured to use the tamper-proof content-addressable look-up table to protect input patterns that are included in a plurality of input cubes stored in the tamper-proof content-addressable look-up table.

7. The computer-accessible medium of claim 6, wherein the computer arrangement is further configured to determine the input cubes based on set of protected input patterns using at least one of (i) a cube compression procedure, or (ii) a cube bit selection procedure.

8. The computer-accessible medium of claim 6, wherein each of the input cubes has a predetermined number of bits.

9. The computer-accessible medium of claim 6, wherein each of the input cubes includes a secret key loaded on to the at least one integrated circuit.

10. The computer-accessible medium of claim 6, wherein the input cubes are associated with at least one flip vector.

11. The computer-accessible medium of claim 10, wherein the at least one flip vector includes information regarding which outputs of the at least one integrated circuit are to be flipped based on each of the input cubes.

12. The computer-accessible medium of claim 11, wherein the computer arrangement is further configured to store the at least one flip vector in the tamper-proof content-addressable look-up table.

13. The computer-accessible medium of claim 6, wherein the computer arrangement is further configured to compress the input cubes prior to being stored in the tamper-proof content-addressable look-up table.

14. The computer-accessible medium of claim 13, wherein the computer arrangement is configured to compress the input cubes by merging compatible input cubes.

15. The computer-accessible medium of claim 1, wherein the at least one restoration unit includes a plurality of XOR gates and at least one adder.

16. The computer-accessible medium of claim 1, wherein the at least one design metric includes at least one of (i) a power, (ii) an area, or (iii) a delay.

17. A method for modifying a design of at least one integrated circuit (IC), comprising:
   modifying at least one logic gate in the design for at least one protected input pattern, wherein the at least one protected input pattern is an input pattern for which the modified design produces a different output than an original design;
   using a computer hardware arrangement, providing at least one restoration unit into the design, wherein the at least one restoration unit is configured to (i) produce at least one error-free output when a correct secret key is applied to the at least one restoration unit and (ii) produce at least one erroneous output when an incorrect key is applied to the at least one restoration unit; and
   performing at least one of:
      (i) determining that the design and the at least one restoration unit produce at least one erroneous output with respect an original design for only a predetermined constant number of incorrect keys based on at least one input pattern, or
      (ii) modifying the at least one logic gate based on a security-aware synthesis procedure which is configured to reduce at least one design metric while ensuring that $k-\log_2 c$ is greater than a target security level, and wherein k is a key size and c is a number of cube.

18. A system for modifying a design of at least one integrated circuit (IC), comprising:
   a data storage device configured to store a set of computer-executable instructions thereon or therein; and
   a processor configured to perform the set of computer-executable instructions;
   wherein the set of computer-executable instruction include:
      modifying at least one logic gate in the design for at least one protected input pattern, wherein the at least one protected input pattern is an input pattern for which the modified design produces a different output than an original design;
      providing at least one restoration unit into the design, wherein the at least one restoration unit is configured to (i) produce at least one error-free output when a correct secret key is applied to the at least one restoration unit and (ii) produce at least one erroneous output when an incorrect key is applied to the at least one restoration unit; and
      performing at least one of:
         (i) determining that the design and the at least one restoration unit produce at least one erroneous output with respect an original design for only a predetermined constant number of incorrect keys based on at least one input pattern, or
         (ii) modifying the at least one logic gate based on a security-aware synthesis procedure which is configured to reduce at least one design metric while ensuring that $k-\log_2 c$ is greater than a target security level, and wherein k is a key size and c is a number of cube.

19. The method of claim 17, wherein the at least one design metric includes at least one of (i) a power, (ii) an area, or (iii) a delay.

20. The system of claim 18, wherein the at least one design metric includes at least one of (i) a power, (ii) an area, or (iii) a delay.

* * * * *